US009549290B2

(12) United States Patent
Smith

(10) Patent No.: US 9,549,290 B2
(45) Date of Patent: Jan. 17, 2017

(54) METHOD AND APPARATUS FOR DETERMINING DIRECTION INFORMATION FOR A WIRELESS DEVICE

(71) Applicant: Google Technology Holdings LLC, Mountain View, CA (US)

(72) Inventor: Dwight R. Smith, Grapevine, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/150,047

(22) Filed: Jan. 8, 2014

(65) Prior Publication Data

US 2015/0181388 A1 Jun. 25, 2015

Related U.S. Application Data

(60) Provisional application No. 61/918,547, filed on Dec. 19, 2013.

(51) Int. Cl.
*H04W 4/02* (2009.01)
*H04W 36/00* (2009.01)
*H04W 36/08* (2009.01)
*G01S 3/38* (2006.01)

(52) U.S. Cl.
CPC .............. *H04W 4/026* (2013.01); *G01S 3/38* (2013.01); *H04W 36/0072* (2013.01); *H04W 36/08* (2013.01)

(58) Field of Classification Search
CPC .................. H04N 21/25841; H04N 21/41407; H04N 21/42202; H04N 21/4524; H04N 21/6131
See application file for complete search history.

(56) References Cited

U.S. PATENT DOCUMENTS

| | | | |
|---|---|---|---|
| 4,612,669 | A | 9/1986 | Nossen |
| 4,631,543 | A | 12/1986 | Brodeur |
| 4,754,285 | A | 6/1988 | Robitaille |
| 4,881,123 | A | 11/1989 | Chapple |
| 4,884,252 | A | 11/1989 | Teodoridis et al. |
| 4,953,197 | A | 8/1990 | Kaewell, Jr. et al. |
| 5,267,234 | A | 11/1993 | Harrison |

(Continued)

FOREIGN PATENT DOCUMENTS

| | | |
|---|---|---|
| CN | 1762137 | 4/2006 |
| CN | 1859656 | 11/2006 |

(Continued)

OTHER PUBLICATIONS

European Patent Office, International Search Report and the Written Opinion in International Patent Application PCT/US2014/070925 (May 11, 2015).

(Continued)

*Primary Examiner* — Matthew Sams
(74) *Attorney, Agent, or Firm* — Wolfe-SBMC

(57) ABSTRACT

A method performed by an apparatus includes scanning at least one of multiple radio frequencies using at least two beamforming antennas of a plurality of beamforming antennas coupled to the eyewear and detecting, on a first scanned radio frequency, first externally emitted radio energy. The method further includes identifying a first wireless device using the detected first externally emitted radio energy and determining a first direction of the first wireless device relative to the eyewear.

20 Claims, 7 Drawing Sheets

(56) References Cited

U.S. PATENT DOCUMENTS

| | | |
|---|---|---|
| 5,459,440 A | 10/1995 | Claridge et al. |
| 5,564,086 A | 10/1996 | Cygan et al. |
| 5,634,200 A | 5/1997 | Kitakubo et al. |
| 5,649,307 A | 7/1997 | Patino |
| 5,699,319 A | 12/1997 | Skrivervik |
| 5,757,326 A | 5/1998 | Koyama et al. |
| 5,804,944 A | 9/1998 | Alberkrack et al. |
| 5,862,458 A | 1/1999 | Ishii |
| 6,144,186 A | 11/2000 | Thandiwe et al. |
| 6,339,758 B1 | 1/2002 | Kanazawa et al. |
| 6,362,690 B1 | 3/2002 | Tichauer |
| 6,373,439 B1 | 4/2002 | Zurcher et al. |
| 6,400,702 B1 | 6/2002 | Meier |
| 6,560,444 B1 | 5/2003 | Imberg |
| 6,594,508 B1 | 7/2003 | Ketonen |
| 6,674,291 B1 | 1/2004 | Barber et al. |
| 6,879,942 B1 | 4/2005 | Nagase et al. |
| 6,927,555 B2 | 8/2005 | Johnson |
| 6,937,980 B2 | 8/2005 | Krasny et al. |
| 7,019,702 B2 | 3/2006 | Henriet et al. |
| 7,142,884 B2 | 11/2006 | Hagn |
| 7,199,754 B2 | 4/2007 | Krumm et al. |
| 7,202,734 B1 | 4/2007 | Raab |
| 7,202,815 B2 | 4/2007 | Swope et al. |
| 7,224,992 B2 | 5/2007 | Patino et al. |
| 7,254,420 B1 | 8/2007 | Klein |
| 7,260,366 B2 | 8/2007 | Lee et al. |
| 7,359,504 B1 | 4/2008 | Reuss et al. |
| 7,400,907 B2 | 7/2008 | Jin et al. |
| 7,433,661 B2 | 10/2008 | Kogiantis et al. |
| 7,436,896 B2 | 10/2008 | Hottinen et al. |
| 7,440,731 B2 | 10/2008 | Staudinger et al. |
| 7,471,963 B2 | 12/2008 | Kim et al. |
| 7,486,931 B2 | 2/2009 | Cho et al. |
| 7,504,833 B1 | 3/2009 | Seguine |
| 7,599,420 B2 | 10/2009 | Forenza et al. |
| 7,620,432 B2 | 11/2009 | Willins et al. |
| D606,958 S | 12/2009 | Knoppert et al. |
| 7,639,660 B2 | 12/2009 | Kim et al. |
| 7,643,642 B2 | 1/2010 | Patino et al. |
| 7,649,831 B2 | 1/2010 | Van Rensburg et al. |
| 7,664,200 B2 | 2/2010 | Ariyavisitakul et al. |
| 7,746,943 B2 | 6/2010 | Yamaura |
| 7,760,681 B1 | 7/2010 | Chhabra |
| 7,773,535 B2 | 8/2010 | Vook et al. |
| 7,773,685 B2 | 8/2010 | Tirkkonen et al. |
| 7,813,696 B2 | 10/2010 | Kim |
| 7,822,140 B2 | 10/2010 | Catreux et al. |
| 7,835,711 B2 | 11/2010 | McFarland |
| 7,839,201 B2 | 11/2010 | Jacobson |
| 7,864,969 B1 | 1/2011 | Ma et al. |
| 7,885,211 B2 | 2/2011 | Shen et al. |
| 7,936,237 B2 | 5/2011 | Park et al. |
| 7,940,740 B2 | 5/2011 | Krishnamurthy et al. |
| 7,942,936 B2 * | 5/2011 | Golden ............................ 726/35 |
| 7,945,229 B2 | 5/2011 | Wilson et al. |
| 7,983,722 B2 | 7/2011 | Lowles et al. |
| 8,014,455 B2 | 9/2011 | Kim et al. |
| 8,072,285 B2 | 12/2011 | Spears et al. |
| 8,094,011 B2 | 1/2012 | Faris et al. |
| 8,095,081 B2 | 1/2012 | Vance |
| 8,098,120 B2 | 1/2012 | Steeneken et al. |
| 8,155,683 B2 | 4/2012 | Buckley et al. |
| 8,204,446 B2 | 6/2012 | Scheer et al. |
| 8,219,336 B2 | 7/2012 | Hoebel et al. |
| 8,219,337 B2 | 7/2012 | Hoebel et al. |
| 8,232,685 B2 | 7/2012 | Perper et al. |
| 8,233,851 B2 | 7/2012 | Jeon et al. |
| 8,244,317 B2 | 8/2012 | Knoppert et al. |
| 8,259,431 B2 | 9/2012 | Katta |
| 8,275,327 B2 | 9/2012 | Yi et al. |
| 8,280,038 B2 | 10/2012 | Johnson et al. |
| 8,280,323 B2 | 10/2012 | Thompson |
| 8,284,849 B2 | 10/2012 | Lee et al. |
| 8,302,183 B2 | 10/2012 | Sood |
| 8,319,393 B2 | 11/2012 | DeReus |
| 8,373,596 B1 | 2/2013 | Kimball et al. |
| 8,374,633 B2 | 2/2013 | Frank et al. |
| 8,384,695 B2 | 2/2013 | Lee et al. |
| 8,428,022 B2 | 4/2013 | Frank et al. |
| 8,460,961 B2 | 6/2013 | Guo et al. |
| 8,483,707 B2 | 7/2013 | Krishnamurthy et al. |
| 8,509,338 B2 | 8/2013 | Sayana et al. |
| 8,542,776 B2 | 9/2013 | Kim et al. |
| 8,588,426 B2 | 11/2013 | Xin et al. |
| 8,594,584 B2 | 11/2013 | Greene et al. |
| 8,606,200 B2 | 12/2013 | Ripley et al. |
| 8,611,829 B2 | 12/2013 | Alberth et al. |
| 8,620,348 B2 | 12/2013 | Shrivastava et al. |
| 8,626,083 B2 | 1/2014 | Greene et al. |
| 8,712,340 B2 | 4/2014 | Hoirup et al. |
| 8,712,355 B2 | 4/2014 | Black et al. |
| 8,731,496 B2 | 5/2014 | Drogi et al. |
| 8,761,296 B2 | 6/2014 | Zhang et al. |
| 8,767,722 B2 | 7/2014 | Kamble et al. |
| 8,909,173 B2 | 12/2014 | Harmke |
| 8,989,747 B2 * | 3/2015 | Padden et al. ............... 455/440 |
| 9,002,354 B2 | 4/2015 | Krishnamurthy et al. |
| 9,031,523 B2 | 5/2015 | Anderson |
| 9,197,255 B2 | 11/2015 | Pourkhaatoun et al. |
| 9,203,489 B2 | 12/2015 | Sayana et al. |
| 9,215,659 B2 | 12/2015 | Asrani et al. |
| 9,241,050 B1 | 1/2016 | Asrani et al. |
| 9,298,303 B2 | 3/2016 | Wagner et al. |
| 9,301,177 B2 | 3/2016 | Ballantyne et al. |
| 9,326,320 B2 | 4/2016 | Hong et al. |
| 9,344,837 B2 | 5/2016 | Russell et al. |
| 9,386,542 B2 | 7/2016 | Russell et al. |
| 9,413,409 B2 | 8/2016 | Black et al. |
| 9,491,007 B2 | 11/2016 | Black et al. |
| 2001/0034238 A1 | 10/2001 | Voyer |
| 2002/0037742 A1 | 3/2002 | Enderlein et al. |
| 2002/0057751 A1 | 5/2002 | Jagger et al. |
| 2002/0090974 A1 | 7/2002 | Hagn |
| 2002/0138254 A1 | 9/2002 | Isaka et al. |
| 2002/0149351 A1 | 10/2002 | Kanekawa et al. |
| 2002/0193130 A1 | 12/2002 | Yang et al. |
| 2003/0143961 A1 | 7/2003 | Humphreys et al. |
| 2003/0161485 A1 | 8/2003 | Smith |
| 2003/0222819 A1 | 12/2003 | Karr et al. |
| 2004/0051583 A1 | 3/2004 | Hellberg |
| 2004/0052314 A1 | 3/2004 | Copeland |
| 2004/0057530 A1 | 3/2004 | Tarokh et al. |
| 2004/0063439 A1 | 4/2004 | Glazko et al. |
| 2004/0082356 A1 | 4/2004 | Walton et al. |
| 2004/0106428 A1 | 6/2004 | Shoji |
| 2004/0148333 A1 | 7/2004 | Manion et al. |
| 2004/0176125 A1 | 9/2004 | Lee |
| 2004/0178912 A1 | 9/2004 | Smith et al. |
| 2004/0192398 A1 | 9/2004 | Zhu |
| 2004/0198392 A1* | 10/2004 | Harvey et al. ............. 455/456.1 |
| 2004/0235433 A1 | 11/2004 | Hugl et al. |
| 2004/0246048 A1 | 12/2004 | Leyonhjelm et al. |
| 2005/0037733 A1* | 2/2005 | Coleman et al. ............. 455/411 |
| 2005/0041018 A1 | 2/2005 | Philipp |
| 2005/0075123 A1 | 4/2005 | Jin et al. |
| 2005/0085195 A1 | 4/2005 | Tong et al. |
| 2005/0124393 A1 | 6/2005 | Nuovo et al. |
| 2005/0134456 A1 | 6/2005 | Niu et al. |
| 2005/0135324 A1 | 6/2005 | Kim et al. |
| 2005/0136845 A1 | 6/2005 | Masuoka et al. |
| 2005/0208952 A1 | 9/2005 | Dietrich et al. |
| 2005/0227640 A1 | 10/2005 | Haque et al. |
| 2005/0250532 A1 | 11/2005 | Hwang et al. |
| 2006/0019677 A1 | 1/2006 | Teague et al. |
| 2006/0052131 A1 | 3/2006 | Ichihara |
| 2006/0067277 A1 | 3/2006 | Thomas et al. |
| 2006/0077952 A1 | 4/2006 | Kubsch et al. |
| 2006/0099940 A1 | 5/2006 | Pfleging et al. |
| 2006/0103635 A1 | 5/2006 | Park |
| 2006/0181453 A1 | 8/2006 | King et al. |
| 2006/0194593 A1* | 8/2006 | Drabeck et al. ........... 455/456.5 |
| 2006/0207806 A1 | 9/2006 | Philipp |
| 2006/0209754 A1 | 9/2006 | Ji et al. |

(56) References Cited

U.S. PATENT DOCUMENTS

| | | |
|---|---|---|
| 2006/0215618 A1 | 9/2006 | Soliman et al. |
| 2006/0240827 A1 | 10/2006 | Dunn |
| 2006/0245601 A1 | 11/2006 | Michaud et al. |
| 2006/0256887 A1 | 11/2006 | Kwon et al. |
| 2006/0280261 A1 | 12/2006 | Prikhodko et al. |
| 2006/0291393 A1 | 12/2006 | Teague et al. |
| 2006/0292990 A1 | 12/2006 | Karabinis et al. |
| 2007/0004344 A1 | 1/2007 | DeGroot et al. |
| 2007/0008108 A1 | 1/2007 | Schurig et al. |
| 2007/0026838 A1 | 2/2007 | Staudinger et al. |
| 2007/0042714 A1 | 2/2007 | Ayed |
| 2007/0049280 A1 | 3/2007 | Sambhwani et al. |
| 2007/0069735 A1 | 3/2007 | Graf et al. |
| 2007/0091004 A1 | 4/2007 | Puuri |
| 2007/0093281 A1 | 4/2007 | Park et al. |
| 2007/0133462 A1 | 6/2007 | Guey |
| 2007/0153743 A1 | 7/2007 | Mukkavilli et al. |
| 2007/0197180 A1 | 8/2007 | McKinzie et al. |
| 2007/0200766 A1 | 8/2007 | McKinzie et al. |
| 2007/0211657 A1 | 9/2007 | McBeath et al. |
| 2007/0211813 A1 | 9/2007 | Talwar et al. |
| 2007/0222629 A1 | 9/2007 | Yoneyama |
| 2007/0223422 A1 | 9/2007 | Kim et al. |
| 2007/0232370 A1 | 10/2007 | Kim |
| 2007/0238425 A1 | 10/2007 | McFarland |
| 2007/0238496 A1 | 10/2007 | Chung et al. |
| 2007/0243894 A1 | 10/2007 | Das et al. |
| 2007/0255558 A1 | 11/2007 | Yasunaga et al. |
| 2007/0280160 A1 | 12/2007 | Kim et al. |
| 2007/0285326 A1 | 12/2007 | McKinzie |
| 2008/0001915 A1 | 1/2008 | Pihlaja et al. |
| 2008/0002735 A1 | 1/2008 | Poirier et al. |
| 2008/0014960 A1 | 1/2008 | Chou |
| 2008/0026710 A1 | 1/2008 | Buckley |
| 2008/0080449 A1 | 4/2008 | Huang et al. |
| 2008/0089312 A1 | 4/2008 | Malladi |
| 2008/0095109 A1 | 4/2008 | Malladi et al. |
| 2008/0108310 A1 | 5/2008 | Tong et al. |
| 2008/0111714 A1 | 5/2008 | Kremin |
| 2008/0117886 A1 | 5/2008 | Kim |
| 2008/0130626 A1 | 6/2008 | Ventola et al. |
| 2008/0132247 A1 | 6/2008 | Anderson |
| 2008/0133462 A1 | 6/2008 | Aylward et al. |
| 2008/0157893 A1 | 7/2008 | Krah |
| 2008/0159239 A1 | 7/2008 | Odlyzko et al. |
| 2008/0165876 A1 | 7/2008 | Suh et al. |
| 2008/0167040 A1 | 7/2008 | Khandekar et al. |
| 2008/0167073 A1 | 7/2008 | Hobson et al. |
| 2008/0170602 A1 | 7/2008 | Guey |
| 2008/0170608 A1 | 7/2008 | Guey |
| 2008/0186105 A1 | 8/2008 | Scuderi et al. |
| 2008/0192683 A1 | 8/2008 | Han et al. |
| 2008/0212520 A1 | 9/2008 | Chen et al. |
| 2008/0225693 A1 | 9/2008 | Zhang et al. |
| 2008/0227414 A1 | 9/2008 | Karmi et al. |
| 2008/0227481 A1 | 9/2008 | Naguib et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0279300 A1 | 11/2008 | Walker et al. |
| 2008/0298482 A1 | 12/2008 | Rensburg et al. |
| 2008/0307427 A1 | 12/2008 | Pi et al. |
| 2008/0309633 A1 | 12/2008 | Hotelling et al. |
| 2008/0313146 A1* | 12/2008 | Wong et al. ............... 707/3 |
| 2008/0317259 A1 | 12/2008 | Zhang et al. |
| 2009/0041151 A1 | 2/2009 | Khan et al. |
| 2009/0055170 A1 | 2/2009 | Nagahama |
| 2009/0059783 A1 | 3/2009 | Walker et al. |
| 2009/0061790 A1 | 3/2009 | Rofougaran |
| 2009/0061887 A1 | 3/2009 | Hart et al. |
| 2009/0067382 A1 | 3/2009 | Li et al. |
| 2009/0091551 A1 | 4/2009 | Hotelling et al. |
| 2009/0102294 A1 | 4/2009 | Hodges et al. |
| 2009/0121963 A1 | 5/2009 | Greene |
| 2009/0122758 A1 | 5/2009 | Smith et al. |
| 2009/0122884 A1 | 5/2009 | Vook et al. |
| 2009/0228598 A1 | 9/2009 | Stamoulis et al. |
| 2009/0238131 A1 | 9/2009 | Montojo et al. |
| 2009/0243631 A1 | 10/2009 | Kuang |
| 2009/0252077 A1 | 10/2009 | Khandekar et al. |
| 2009/0256644 A1 | 10/2009 | Knudsen |
| 2009/0258614 A1 | 10/2009 | Walker |
| 2009/0262699 A1 | 10/2009 | Wengerter et al. |
| 2009/0264078 A1 | 10/2009 | Yun et al. |
| 2009/0268675 A1 | 10/2009 | Choi |
| 2009/0270103 A1 | 10/2009 | Pani et al. |
| 2009/0285321 A1 | 11/2009 | Schulz et al. |
| 2009/0290544 A1 | 11/2009 | Yano et al. |
| 2009/0295226 A1 | 12/2009 | Hodges et al. |
| 2009/0298433 A1 | 12/2009 | Sorrells et al. |
| 2009/0307511 A1 | 12/2009 | Fiennes et al. |
| 2009/0323608 A1* | 12/2009 | Adachi et al. ............... 370/329 |
| 2010/0002657 A1 | 1/2010 | Teo et al. |
| 2010/0014690 A1 | 1/2010 | Wolff et al. |
| 2010/0023898 A1 | 1/2010 | Nomura et al. |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0056166 A1 | 3/2010 | Tenny |
| 2010/0081487 A1 | 4/2010 | Chen et al. |
| 2010/0085010 A1 | 4/2010 | Suzuki et al. |
| 2010/0103949 A1 | 4/2010 | Jung et al. |
| 2010/0106459 A1 | 4/2010 | Bakalov |
| 2010/0109796 A1 | 5/2010 | Park et al. |
| 2010/0118706 A1 | 5/2010 | Parkvall et al. |
| 2010/0118839 A1 | 5/2010 | Malladi et al. |
| 2010/0156728 A1 | 6/2010 | Alvey et al. |
| 2010/0157858 A1 | 6/2010 | Lee et al. |
| 2010/0157924 A1 | 6/2010 | Prasad et al. |
| 2010/0159833 A1 | 6/2010 | Lewis et al. |
| 2010/0161658 A1* | 6/2010 | Hamynen et al. ............ 707/770 |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0189191 A1 | 7/2010 | Taoka et al. |
| 2010/0195566 A1 | 8/2010 | Krishnamurthy et al. |
| 2010/0208838 A1 | 8/2010 | Lee et al. |
| 2010/0217590 A1 | 8/2010 | Nemer et al. |
| 2010/0220801 A1 | 9/2010 | Lee et al. |
| 2010/0260154 A1 | 10/2010 | Frank et al. |
| 2010/0271330 A1 | 10/2010 | Philipp |
| 2010/0272094 A1 | 10/2010 | Byard et al. |
| 2010/0274516 A1 | 10/2010 | Hoebel et al. |
| 2010/0291918 A1 | 11/2010 | Suzuki et al. |
| 2010/0311437 A1 | 12/2010 | Palanki et al. |
| 2010/0317343 A1 | 12/2010 | Krishnamurthy |
| 2010/0322176 A1 | 12/2010 | Chen et al. |
| 2010/0323718 A1 | 12/2010 | Jen |
| 2011/0039583 A1 | 2/2011 | Frank et al. |
| 2011/0051834 A1 | 3/2011 | Lee et al. |
| 2011/0080969 A1 | 4/2011 | Jöngren et al. |
| 2011/0083066 A1 | 4/2011 | Chung et al. |
| 2011/0085588 A1 | 4/2011 | Zhuang |
| 2011/0085610 A1 | 4/2011 | Zhuang et al. |
| 2011/0096739 A1* | 4/2011 | Heidari et al. ............... 370/329 |
| 2011/0096915 A1 | 4/2011 | Nemer |
| 2011/0103498 A1 | 5/2011 | Chen et al. |
| 2011/0105023 A1 | 5/2011 | Scheer |
| 2011/0116423 A1 | 5/2011 | Rousu et al. |
| 2011/0116436 A1 | 5/2011 | Bachu et al. |
| 2011/0117925 A1 | 5/2011 | Sampath et al. |
| 2011/0119005 A1 | 5/2011 | Majima et al. |
| 2011/0121836 A1 | 5/2011 | Kim et al. |
| 2011/0143770 A1 | 6/2011 | Charbit et al. |
| 2011/0143773 A1 | 6/2011 | Kangas et al. |
| 2011/0148625 A1 | 6/2011 | Velusamy |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0157067 A1 | 6/2011 | Wagner et al. |
| 2011/0158200 A1 | 6/2011 | Bachu et al. |

(56) References Cited

U.S. PATENT DOCUMENTS

| | | |
|---|---|---|
| 2011/0176252 A1 | 7/2011 | DeReus |
| 2011/0189964 A1 | 8/2011 | Jeon et al. |
| 2011/0190016 A1 | 8/2011 | Hamabe et al. |
| 2011/0216840 A1 | 9/2011 | Lee et al. |
| 2011/0244884 A1 | 10/2011 | Kangas et al. |
| 2011/0249637 A1 | 10/2011 | Hammarwall et al. |
| 2011/0250852 A1 | 10/2011 | Greene |
| 2011/0263303 A1 | 10/2011 | Lowles et al. |
| 2011/0268101 A1 | 11/2011 | Wang |
| 2011/0274188 A1 | 11/2011 | Sayana et al. |
| 2011/0281532 A1 | 11/2011 | Shin et al. |
| 2011/0285603 A1 | 11/2011 | Skarp |
| 2011/0286349 A1 | 11/2011 | Tee et al. |
| 2011/0292844 A1 | 12/2011 | Kwun et al. |
| 2011/0319027 A1 | 12/2011 | Sayana |
| 2012/0002609 A1 | 1/2012 | Larsson et al. |
| 2012/0008510 A1 | 1/2012 | Cai et al. |
| 2012/0021769 A1 | 1/2012 | Lindoff et al. |
| 2012/0032646 A1 | 2/2012 | Lee |
| 2012/0039251 A1 | 2/2012 | Sayana |
| 2012/0050122 A1 | 3/2012 | Wu et al. |
| 2012/0052903 A1 | 3/2012 | Han et al. |
| 2012/0071195 A1 | 3/2012 | Chakraborty et al. |
| 2012/0076043 A1 | 3/2012 | Nishio et al. |
| 2012/0077538 A1 | 3/2012 | Yun |
| 2012/0106475 A1 | 5/2012 | Jung |
| 2012/0112851 A1 | 5/2012 | Manssen et al. |
| 2012/0120772 A1 | 5/2012 | Fujisawa |
| 2012/0120934 A1 | 5/2012 | Cho |
| 2012/0122478 A1 | 5/2012 | Siomina et al. |
| 2012/0158839 A1 | 6/2012 | Hassan et al. |
| 2012/0161927 A1 | 6/2012 | Pierfelice et al. |
| 2012/0162129 A1 | 6/2012 | Krah et al. |
| 2012/0170541 A1 | 7/2012 | Love et al. |
| 2012/0177089 A1 | 7/2012 | Pelletier et al. |
| 2012/0178370 A1 | 7/2012 | George |
| 2012/0182144 A1 | 7/2012 | Richardson et al. |
| 2012/0206556 A1 | 8/2012 | Yu et al. |
| 2012/0214412 A1 | 8/2012 | Schlub et al. |
| 2012/0214421 A1 | 8/2012 | Hoirup et al. |
| 2012/0214549 A1 | 8/2012 | Philbin |
| 2012/0220243 A1 | 8/2012 | Mendolia |
| 2012/0224715 A1 | 9/2012 | Kikkeri |
| 2012/0295554 A1 | 11/2012 | Greene et al. |
| 2012/0295555 A1 | 11/2012 | Greene et al. |
| 2012/0302188 A1 | 11/2012 | Sahota et al. |
| 2012/0306716 A1 | 12/2012 | Satake et al. |
| 2012/0309388 A1 | 12/2012 | Moosavi et al. |
| 2012/0309413 A1 | 12/2012 | Grosman et al. |
| 2012/0316967 A1 | 12/2012 | Mgrdechian et al. |
| 2013/0030803 A1 | 1/2013 | Liao |
| 2013/0034241 A1 | 2/2013 | Pandey et al. |
| 2013/0039284 A1 | 2/2013 | Marinier et al. |
| 2013/0040578 A1 | 2/2013 | Khoshnevis et al. |
| 2013/0059600 A1 | 3/2013 | Elsom-Cook et al. |
| 2013/0078980 A1 | 3/2013 | Saito |
| 2013/0094484 A1 | 4/2013 | Kneckt et al. |
| 2013/0109314 A1 | 5/2013 | Kneckt et al. |
| 2013/0109334 A1 | 5/2013 | Kwon et al. |
| 2013/0142113 A1 | 6/2013 | Fong et al. |
| 2013/0150092 A1 | 6/2013 | Frank et al. |
| 2013/0178175 A1 | 7/2013 | Kato |
| 2013/0194154 A1 | 8/2013 | Puente Ballarda et al. |
| 2013/0195283 A1 | 8/2013 | Larson et al. |
| 2013/0195296 A1 | 8/2013 | Merks |
| 2013/0231151 A1 | 9/2013 | Kneckt et al. |
| 2013/0286937 A1* | 10/2013 | Liu et al. ............ 370/328 |
| 2013/0307735 A1 | 11/2013 | Contreras et al. |
| 2013/0310102 A1 | 11/2013 | Chao et al. |
| 2013/0316687 A1 | 11/2013 | Subbaramoo et al. |
| 2013/0322375 A1 | 12/2013 | Chang et al. |
| 2013/0322562 A1 | 12/2013 | Zhang et al. |
| 2013/0322655 A1 | 12/2013 | Schuldt et al. |
| 2013/0325149 A1 | 12/2013 | Manssen et al. |
| 2014/0024321 A1 | 1/2014 | Zhu et al. |
| 2014/0044126 A1 | 2/2014 | Sabhanatarajan et al. |
| 2014/0045422 A1 | 2/2014 | Qi et al. |
| 2014/0068288 A1 | 3/2014 | Robinson et al. |
| 2014/0092830 A1 | 4/2014 | Chen et al. |
| 2014/0093091 A1 | 4/2014 | Dusan et al. |
| 2014/0177686 A1 | 6/2014 | Greene et al. |
| 2014/0185498 A1 | 7/2014 | Schwent et al. |
| 2014/0227981 A1 | 8/2014 | Pecen et al. |
| 2014/0273882 A1 | 9/2014 | Asrani et al. |
| 2014/0273886 A1 | 9/2014 | Black et al. |
| 2014/0313088 A1 | 10/2014 | Rozenblit et al. |
| 2014/0349593 A1 | 11/2014 | Danak et al. |
| 2014/0376652 A1 | 12/2014 | Sayana et al. |
| 2014/0379332 A1 | 12/2014 | Rodriguez et al. |
| 2015/0017978 A1 | 1/2015 | Hong et al. |
| 2015/0024786 A1 | 1/2015 | Asrani et al. |
| 2015/0031420 A1 | 1/2015 | Higaki et al. |
| 2015/0072632 A1 | 3/2015 | Pourkhaatoun et al. |
| 2015/0080047 A1 | 3/2015 | Russell et al. |
| 2015/0092954 A1 | 4/2015 | Coker et al. |
| 2015/0171919 A1 | 6/2015 | Ballantyne et al. |
| 2015/0236828 A1 | 8/2015 | Park et al. |
| 2015/0245323 A1 | 8/2015 | You et al. |
| 2015/0280674 A1 | 10/2015 | Langer et al. |
| 2015/0280675 A1 | 10/2015 | Langer et al. |
| 2015/0280876 A1 | 10/2015 | You et al. |
| 2015/0312058 A1 | 10/2015 | Black et al. |
| 2015/0349410 A1 | 12/2015 | Russell et al. |
| 2015/0365065 A1 | 12/2015 | Higaki et al. |
| 2016/0014727 A1 | 1/2016 | Nimbalker |
| 2016/0036482 A1 | 2/2016 | Black et al. |
| 2016/0080053 A1 | 3/2016 | Sayana et al. |

FOREIGN PATENT DOCUMENTS

| | | |
|---|---|---|
| CN | 1984476 | 6/2007 |
| CN | 101035379 | 9/2007 |
| DE | 10053205 | 5/2002 |
| DE | 10118189 | 11/2002 |
| EP | 0695059 | 1/1996 |
| EP | 1158686 | 11/2001 |
| EP | 1298809 | 4/2003 |
| EP | 1357543 | 10/2003 |
| EP | 1511010 | 3/2005 |
| EP | 1753152 | 2/2007 |
| EP | 1443791 | 2/2009 |
| EP | 2487967 | 8/2012 |
| EP | 2255443 | 11/2012 |
| EP | 2557433 | 2/2013 |
| EP | 2568531 | 3/2013 |
| EP | 2590258 | 5/2013 |
| JP | H09247852 | 9/1997 |
| JP | 2000286924 | 10/2000 |
| KR | 20050058333 | 6/2005 |
| RU | 2005113251 | 1/2006 |
| WO | WO-9306682 | 4/1993 |
| WO | WO-9416517 | 7/1994 |
| WO | 9600401 | 1/1996 |
| WO | WO-9921389 | 4/1999 |
| WO | WO-9950968 | 10/1999 |
| WO | WO-0111721 | 2/2001 |
| WO | WO-03007508 | 1/2003 |
| WO | WO-03107327 | 12/2003 |
| WO | WO-2004021634 | 3/2004 |
| WO | WO-2004040800 | 5/2004 |
| WO | WO-2004084427 | 9/2004 |
| WO | WO-2004084447 | 9/2004 |
| WO | WO-2006039434 | 4/2006 |
| WO | WO-2006046192 | 5/2006 |
| WO | WO-2006130278 | 12/2006 |
| WO | WO-2007052115 | 5/2007 |
| WO | WO-2007080727 | 7/2007 |
| WO | 2008027705 A1 | 3/2008 |
| WO | WO-2008033117 | 3/2008 |
| WO | WO-2008085107 | 7/2008 |
| WO | WO-2008085416 | 7/2008 |
| WO | WO-2008085720 | 7/2008 |
| WO | WO-2008112849 | 9/2008 |
| WO | WO-2008113210 | 9/2008 |

(56) References Cited

FOREIGN PATENT DOCUMENTS

| WO | WO-2008137354 | 11/2008 |
|---|---|---|
| WO | WO-2008137607 | 11/2008 |
| WO | WO-2008156081 | 12/2008 |
| WO | WO-2009107090 | 9/2009 |
| WO | WO-2010080845 | 7/2010 |
| WO | WO-2010124244 | 10/2010 |
| WO | WO-2010138039 | 12/2010 |
| WO | WO-2012115649 | 8/2012 |
| WO | WO-2012149968 | 11/2012 |
| WO | WO-2012177939 | 12/2012 |
| WO | WO-2013131268 | 9/2013 |

OTHER PUBLICATIONS

"3rd Generation Partnership Project; Technical Specification Group Radio Access Network", 3GPP TR 36.814 V9.0.0 (Mar. 2010), Further Advancements for E-UTRA Physical Layer Aspects (Release 9), Mar. 2010, 104 pages.
"A feedback framework based on W2W1 for Rei. 10", 3GPP TSG RAN WG1 #61bis, R1-103664,, Jun. 2010, 19 pages.
"Addition of PRS Muting Configuration Information to LPPa", 3GPP TSG RAN3 #68, Montreal, Canada; Ericsson, R3-101526, May 2010, 7 pages.
"Advisory Action", U.S. Appl. No. 12/650,699, Jan. 30, 2013, 3 pages.
"Advisory Action", U.S. Appl. No. 12/650,699, Sep. 25, 2014, 3 pages.
"An-1432 the LM4935 Headset and Push-Button Detection Guide", Texas Instruments Incorporated—http://www.ti.com/lit/an/snaa024a.snaa024a.pdf, May 2013, 8 pages.
"Best Companion' reporting for improved single- cell MU-MIMO pairing", 3GPP TSG RAN WG1 #56; Athens, Greece; Alcatei-Lucent, R1-090926, Feb. 2009, 5 pages.
"Change Request—Clarification of the CP length of empty OFDM symbols in PRS subframes", 3GPP TSG RAN WG1 #59bis, Jeju, Vaiencia, Spain, ST-Ericsson, Motorola, Qualcomm Inc, R1-100311;, Jan. 2009, 2 pages.
"Change Request 36.211—Introduction of L TE Positioning", 3GPP TSG RAN WG1 #59, Jeju, South Korea; Ericsson, R1-095027, May 2010, 6 pages.
"Change Request 36.213 Clarification of POSCH and PRS in combination for L TE positioning", 3GPP TSG RAN WG1 #58bis, Miyazaki, Japan; Ericsson, et al., R1-094262;, Oct. 2009, 4 pages.
"Change Request 36.214—Introduction of LTE Positioning", 3GPP TSG RAN WG1 #59, Jeju, South Korea, Ericsson, et al., R1-094430, Nov. 2009, 4 pages.
"Companion Subset Based PMI/CQI Feedback for LTE-A MU-MIMO", 3GPP TSG RAN WG1 #60; San Francisco, USA, RIM; R1-101104, Feb. 2010, 8 pages.
"Comparison of PMI-based and SCF-based MU-MIMO", 3GPP TSG RAN1 #58; Shenzhen, China; R1-093421 Aug. 2009, 5 pages.
"Development of two-stage feedback framework for Rel-10", 3GPP TSG RAN WG1 #60bis Meeting, R1-101859, Alcatel-Lucent Shanghai Bell, Alcatel-Lucent, Apr. 2010, 5 pages.
"Digital cellular telecommunications system (Phase 2+)", Location Services (LCS); Broadcast Network Assistance for Enhanced Observed Time Difference (E-OTD) and Global Positioning System (GPS) Positioning Methods (3GPP TS 04.35 version 8.3.0 Release 1999), 2001, 37 pages.
"Discussions on UE positioning issues", 3GPP TSG-RAN WG1 #57 R1-091911, San Francisco, USA,, May 2009, 12 pages.
"DL Codebook design for 8Tx preceding", 3GPP TSG RAN WG1 #60bis, R1-102380, LG Electronics, Beijing, China, Apr. 2010, 4 pages.
"Double codebook design principles", 3GPP TSG RAN WG1 #61bis, R1-103804, Nokia, Nokia Siemens Networks, Dresden, Germany, Jun. 2010, 9 pages.

"Earbud with Push-to-Talk Microphone", Motorola, Inc., model 53727, iDEN 2.5 mm 4-pole mono PTT headset NNTNN5006BP, 2013, 10 pages.
"Evaluation of protocol architecture alternatives for positioning", 3GPP TSG-RAN WG2 #66bis R2-093855, Los Angeles, CA, USA, Jun. 2009, 4 pages.
"Ex Parte Quayle Action", U.S. Appl. No. 13/088,237, filed Dec. 19, 2012, 5 pages.
"Extended European Search Report", EP Application No. 12196319.3, Feb. 27, 2014, 7 pages.
"Extended European Search Report", EP Application No. 12196328.4, Feb. 26, 2014, 7 pages.
"Extensions to Rel-8 type CQI/PMI/RI feedback using double codebook structure", 3GPP TSG RAN WG1#59bis, R1-100251, Valencia, Spain Jan. 2010, 4 pages.
"Feedback Codebook Design and Performance Evaluation", 3GPP TSG RAN WG1 #61bis, R1-103970, LG Electronics, Jun. 2010, 6 pages.
"Feedback considerations for DL MIMO and CoMP", 3GPP TSG RAN WG1 #57bis; Los Angeles, USA; Qualcomm Europe; R1-092695, Jun. 2009, 6 pages.
"Final Improvement Proposal for PTT Support in HFP", Bluetooth SIG, Inc., revision V10r00 (PTTinHFP_FIPD), Jul. 20, 2010, 50 pages.
"Final Office Action", U.S. Appl. No. 12/407,783, Feb. 15, 2012, 18 pages.
"Final Office Action", U.S. Appl. No. 12/573,456, Mar. 21, 2012, 12 pages.
"Final Office Action", U.S. Appl. No. 12/650,699, Jul. 16, 2014, 20 pages.
"Final Office Action", U.S. Appl. No. 12/650,699, Jul. 29, 2015, 26 pages.
"Final Office Action", U.S. Appl. No. 12/650,699, Nov. 13, 2012, 17 pages.
"Final Office Action", U.S. Appl. No. 12/756,777, Nov. 1, 2013, 12 pages.
"Final Office Action", U.S. Appl. No. 12/899,211, Oct. 24, 2013, 17 pages.
"Final Office Action", U.S. Appl. No. 13/477,609, Jul. 31, 2015, 11 pages.
"Final Office Action", U.S. Appl. No. 13/692,520, Apr. 2, 2015, 15 pages.
"Final Office Action", U.S. Appl. No. 13/721,771, Oct. 29, 2015, 8 pages.
"Final Office Action", U.S. Appl. No. 13/733,297, Jul. 22, 2015, 20 pages.
"Final Office Action", U.S. Appl. No. 13/873,557, Jul. 17, 2015, 13 pages.
"Final Office Action", U.S. Appl. No. 14/012,050, Jul. 6, 2015, 23 pages.
"Final Office Action", U.S. Appl. No. 14/052,903, Oct. 1, 2015, 10 pages.
"Final Office Action", U.S. Appl. No. 14/280,775, Dec. 9, 2015, 13 pages.
"Foreign Office Action", CN Application No. 201080025882.7, Feb. 8, 2014, 19 pages.
"Further details on DL OTDOA", 3GPP TSG RAN WG1 #56bis, Seoul, South Korea—Ericsson, R1-091312,, Mar. 2009, 6 pages.
"Further Refinements of Feedback Framework", 3GPP TSG-RAN WG1 #60bis R1-101742; Ericsson, ST-Ericsson, Apr. 2010, 8 pages.
"IEEE 802.16m System Description Document [Draft]", IEEE 802.16 Broadband Wireless Access Working Group, Nokia, Feb. 7, 2009, 171 pages.
"Implicit feedback in support of downlink MU-MIMO" Texas Instruments, 3GPP TSG RAN WG1 #58; Shenzhen, China, R1-093176, Aug. 2009, 4 pages.
"Improving the hearability of LTE Positioning Service", 3GPP TSG RAN WG1 #55bis; Alcatei-Lucent, R1-090053,, Jan. 2009, 5 pages.
"Innovator in Electronics, Technical Update, Filters & Modules PRM Alignment", Module Business Unit, Apr. 2011, 95 pages.
"International Preliminary Report on Patentability", Application No. PCT/US2013/042042, Mar. 10, 2015, 8 pages.

(56) References Cited

OTHER PUBLICATIONS

"International Search Report and Written Opinion", Application No. PCT/US2014/060440, Feb. 5, 2015, 11 pages.
"International Search Report and Written Opinion", Application No. PCT/US2015/031328, Aug. 12, 2015, 11 pages.
"International Search Report and Written Opinion", Application No. PCT/US2014/045755, Oct. 23, 2014, 11 pages.
"International Search Report and Written Opinion", Application No. PCT/US2014/045956, Oct. 31, 2014, 11 pages.
"International Search Report and Written Opinion", Application No: PCT/US2014/056642, Dec. 9, 2014, 11 pages.
"International Search Report and Written Opinion", Application No. PCT/US2013/071615, Mar. 5, 2014, 13 pages.
"International Search Report and Written Opinion", Application No. PCT/US2013/040242, Oct. 4, 2013, 14 pages.
"International Search Report and Written Opinion", Application No. PCT/US2014/047233, Jan. 22, 2015, 8 pages.
"International Search Report and Written Opinion", Application No. PCT/US2013/077919, Apr. 24, 2014, 8 pages.
"International Search Report and Written Opinion", Application No. PCT/US2014/018564, Jun. 18, 2014, 11 pages.
"International Search Report and Written Opinion", Application No. PCT/US2013/072718, Jun. 18, 2014, 12 pages.
"International Search Report and Written Opinion", Application No. PCT/US2015/027872, Jul. 15, 2015, 12 pages.
"International Search Report and Written Opinion", Application No. PCT/US2010/026579, Feb. 4, 2011, 13 pages.
"International Search Report and Written Opinion", Application No. PCT/US2011/034959, Aug. 16, 2011, 13 pages.
"International Search Report and Written Opinion", Application No. PCT/US2011/045209, Oct. 28, 2011, 14 pages.
"International Search Report and Written Opinion", Application No. PCT/US2011/039214, Sep. 14, 2011, 9 pages.
"International Search Report and Written Opinion", Application No. PCT/US2010/038257, Oct. 1, 2010, 9 pages.
"International Search Report and Written Opinion", Application No. PCT/US2010/034023, Dec. 1, 2010, 9 pages.
"International Search Report", Application No. PCT/US20013/071616, Mar. 5, 2014, 2 pages.
"International Search Report", Application No. PCT/US2010/030516, Oct. 8, 2010, 5 pages.
"International Search Report", Application No. PCT/US2010/036982, Nov. 22, 2010, 4 pages.
"International Search Report", Application No. PCT/US2010/041451, Oct. 25, 2010, 3 pages.
"International Search Report", Application No. PCT/US2011/044103, Oct. 24, 2011, 3 pages.
"International Search Report", Application No. PCT/US2014/014375, Apr. 7, 2014, 4 pages.
"Introduction of L TE Positioning", 3GPP TSG RAN WG1 #58, Shenzhen, China, R1-093604; Draft CR 36.213, Aug. 2009, 3 pages.
"Introduction of L TE Positioning", 3GPP TSG RAN WG1 #59, Jeju, South Korea, Ericsson et al.; R1-094429 Nov. 2009, 5 pages.
"Introduction of LTE Positioning",, 3GPP TSG RAN WG1 #58, Shenzhen, China; Draft CR 36.214; R1-093605;, Aug. 2009, 6 pages.
"Introduction of LTE Positioning",, 3GPP TSG-RAN WG1 Meeting #58, R1-093603, Shenzhen, China Aug. 2009, 5 pages.
"LS on 12 5. Assistance Information for OTDOA Positioning Support for L TE Rel-9", 3GPP TSG RAN WG1 Meeting #58; Shenzhen, China; R1-093729, Aug. 2009, 3 pages.
"LS on LTE measurement supporting Mobility", 3GPP TSG WG1 #48, Tdoc R1-071250; StLouis, USA, Feb. 2007, 2 pages.
"LTE Positioning Protocol (LPP)", 3GPP TS 36.355 V9.0.0 (Dec. 2009); 3rd Generation Partnership Project; Technical Specification Group Radio Access Network; Evolved Universal Terrestrial Radio Access (E-UTRA); Release 9, Dec. 2009, 102 pages.

"Market & Motivation (MRD Section3) for Interoperability Testing of Neighbor Awareness Networking", WiFi Alliance Neighbor Awareness Networking Marketing Task Group, Version 0.14, 2011, 18 pages.
"Marketing Statement of Work Neighbor Awareness Networking", Version 1.17, Neighbor Awareness Networking Task Group, May 2012, 18 pages.
"Method for Channel Quality Feedback in Wireless Communication Systems", U.S. Appl. No. 12/823,178, filed Jun. 25, 2010, 34 pages.
"Motorola SJYN0505A Stereo Push to Talk Headset for Nextel", Motorola Inc., iDEN 5-pole 2.5 mm Stereo Headset SJYN05058A, 2010, 2 pages.
"Non-Final Office Action", U.S. Appl. No. 12/407,783, Sep. 9, 2013, 16 pages.
"Non-Final Office Action", U.S. Appl. No. 12/407,783, Oct. 5, 2011, 14 pages.
"Non-Final Office Action", U.S. Appl. No. 12/480,289, Jun. 9, 2011, 20 pages.
"Non-Final Office Action", U.S. Appl. No. 12/492,339, Aug. 19, 2011, 13 pages.
"Non-Final Office Action", U.S. Appl. No. 12/542,374, Feb. 24, 2014, 25 pages.
"Non-Final Office Action", U.S. Appl. No. 12/542,374, Aug. 7, 2013, 22 pages.
"Non-Final Office Action", U.S. Appl. No. 12/542,374, Aug. 31, 2012, 27 pages.
"Non-Final Office Action", U.S. Appl. No. 12/542,374, Dec. 23, 2011, 22 pages.
"Non-Final Office Action", U.S. Appl. No. 12/573,456, Nov. 18, 2011, 9 pages.
"Non-Final Office Action", U.S. Appl. No. 12/577,553, Feb. 4, 2014, 10 pages.
"Non-Final Office Action", U.S. Appl. No. 12/577,553, Aug. 12, 2013, 11 pages.
"Non-Final Office Action", U.S. Appl. No. 12/577,553, Dec. 28, 2011, 7 pages.
"Non-Final Office Action", U.S. Appl. No. 12/650,699, Mar. 30, 2015, 28 pages.
"Non-Final Office Action", U.S. Appl. No. 12/650,699, Apr. 23, 2013, 19 pages.
"Non-Final Office Action", U.S. Appl. No. 12/650,699, Jul. 19, 2012, 12 pages.
"Non-Final Office Action", U.S. Appl. No. 12/650,699, Dec. 16, 2013, 26 pages.
"Non-Final Office Action", U.S. Appl. No. 12/756,777, Apr. 19, 2013, 17 pages.
"Non-Final Office Action", U.S. Appl. No. 12/813,221, Oct. 8, 2013, 10 pages.
"Non-Final Office Action", U.S. Appl. No. 12/823,178, Aug. 23, 2012, 15 pages.
"Non-Final Office Action", U.S. Appl. No. 12/899,211, Apr. 10, 2014, 12 pages.
"Non-Final Office Action", U.S. Appl. No. 12/899,211, May 22, 2013, 17 pages.
"Non-Final Office Action", U.S. Appl. No. 12/973,467, Mar. 28, 2013, 9 pages.
"Non-Final Office Action", U.S. Appl. No. 13/477,609, Dec. 3, 2014, 7 pages.
"Non-Final Office Action", U.S. Appl. No. 13/477,609, Dec. 14, 2015, 9 pages.
"Non-Final Office Action", U.S. Appl. No. 13/692,520, Sep. 5, 2014, 15 pages.
"Non-Final Office Action", U.S. Appl. No. 13/692,520, Oct. 5, 2015, 17 pages.
"Non-Final Office Action", U.S. Appl. No. 13/721,771, May 20, 2015, 6 pages.
"Non-Final Office Action", U.S. Appl. No. 13/733,297, Mar. 13, 2015, 23 pages.
"Non-Final Office Action", U.S. Appl. No. 13/759,089, Apr. 18, 2013, 16 pages.
"Non-Final Office Action", U.S. Appl. No. 13/873,557, Mar. 11, 2015, 19 pages.

(56) References Cited

OTHER PUBLICATIONS

"Non-Final Office Action", U.S. Appl. No. 13/924,838, Nov. 28, 2014, 6 pages.
"Non-Final Office Action", U.S. Appl. No. 13/945,968, Apr. 28, 2015, 16 pages.
"Non-Final Office Action", U.S. Appl. No. 13/955,723, Dec. 17, 2015, 21 pages.
"Non-Final Office Action", U.S. Appl. No. 14/012,050, Feb. 10, 2015, 18 pages.
"Non-Final Office Action", U.S. Appl. No. 14/031,739, Aug. 18, 2015, 16 pages.
"Non-Final Office Action", U.S. Appl. No. 14/052,903, Mar. 11, 2015, 7 pages.
"Non-Final Office Action", U.S. Appl. No. 14/068,309, Oct. 2, 2015, 14 pages.
"Non-Final Office Action", U.S. Appl. No. 14/226,041, Jun. 5, 2015, 8 pages.
"Non-Final Office Action", U.S. Appl. No. 14/280,775, Jul. 16, 215, 9 pages.
"Non-Final Office Action", U.S. Appl. No. 14/445,715, Jan. 15, 2016, 26 pages.
"Non-Final Office Action", U.S. Appl. No. 14/952,738, Jan. 11, 2016, 7 pages.
"Notice of Allowance", U.S. Appl. No. 12/365,166, Apr. 16, 2010, 7 pages.
"Notice of Allowance", U.S. Appl. No. 12/365,166, Aug. 25, 2010, 4 pages.
"Notice of Allowance", U.S. Appl. No. 12/650,699, Jan. 14, 2016, 8 pages.
"Notice of Allowance", U.S. Appl. No. 13/040,090, Mar. 8, 2012, 6 pages.
"Notice of Allowance", U.S. Appl. No. 13/088,237, Jun. 17, 2013, 8 pages.
"Notice of Allowance", U.S. Appl. No. 13/088,237, Jul. 11, 2013, 8 pages.
"Notice of Allowance", U.S. Appl. No. 13/188,419, May 22, 2013, 8 pages.
"Notice of Allowance", U.S. Appl. No. 13/873,557, Dec. 23, 2015, 10 pages.
"Notice of Allowance", U.S. Appl. No. 13/924,838, Mar. 12, 2015, 7 pages.
"Notice of Allowance", U.S. Appl. No. 13/924,838, Jul. 8, 2015, 7 pages.
"Notice of Allowance", U.S. Appl. No. 13/945,968, Sep. 16, 2015, 6 pages.
"Notice of Allowance", U.S. Appl. No. 14/012,050, Dec. 14, 2015, 12 pages.
"Notice of Allowance", U.S. Appl. No. 14/226,041, Dec. 31, 2015, 5 pages.
"Notice of Allowance", U.S. Appl. No. 14/488,709, Sep. 23, 2015, 10 pages.
"On Extensions to Rel-8 PMI Feedback", 3GPP TSG RAN WG1 #60, R1-101129, Motorola, San Francisco, USA,, Feb. 2010, 4 pages.
"On OTDOA in LTE", 3GPP TSG RAN WG1 #55bis, Ljubljana, Slovenia; R1-090353, Jan. 2009, 8 pages.
"On OTDOA method for L TE Positioning", 3GPP TSG RAN WG1 #56, Ericsson, R1-090918, Athens, Greece, Feb. 2009, 6 pages.
"On Serving Cell Muting for OTDOA Measurements", 3GPP TSG RAN1 #57, R1-092628—Los Angeles, CA, USA, Jun. 2009, 7 pages.
"Performance evaluation of adaptive codebook as enhancement of 4 Tx feedback", 3GPP TSG RAN WG1#61bis, R1-103447, Jul. 2010, 6 pages.
"PHY Layer 1 1 4. Specification Impact of Positioning Improvements", 3GPP TSG RAN WG1 #56bis, Athens, Greece; Qualcomm Europe, R1-090852,, Feb. 2009, 3 pages.
"Physical Channels and Modulation (Release 8)", 3GPP TS 36.211 V8.6.0 (Mar. 2009) 3rd Generation Partnership Project; Technical Specification Group Radio Access 28 Network; Evolved Universal Terrestrial Radio Access (E-UTRA);, Mar. 2009, 83 pages.
"Physical Channels and Modulation (Release 9)", 3GPP TS 36.211 V9.0.0 (Dec. 2009); 3rd Generation Partnership Project; Technical Specification Group Radio Access Network; Evolved Universal Terrestrial Radio Access (E-UTRA); Release 9, Dec. 2009, 85 pages.
"Physical layer procedures", 3GPP TS 36.213 V9.0.1 (Dec. 2009); 3rd Generation Partnership Project; Technical Specification Group Radio Access Network; Evolved Universal Terrestrial Radio Access (E-UTRA); Release 9, Dec. 2009, 79 pages.
"Positioning Subframe Muting for OTDOA Measurements", 3GPP TSG RAN1 #58 R1-093406, Shenzhen, P. R. China, Aug. 2009, 9 pages.
"Positioning Support for L TE", 3GPP TSG RAN WG1 #42, Athens, Greece, RP-080995, Dec. 2008, 5 pages.
"Pre-Brief Appeal Conference Decision", U.S. Appl. No. 12/650,699, Apr. 9, 2013, 2 pages.
"Rationale for mandating simulation of 4Tx Widely-Spaced Cross-Polarized Antenna Configuration for LTE-Advanced MU-MIMO", 3GPP TSG-RAN WG1 Meeting #61bis, R1-104184, Dresden, Germany, Jun. 2010, 5 pages.
"Reference Signals for Low Interference Subframes in Downlink;", 3GPP TSG RAN WG1 Meeting #56bis; Seoul, South Korea; Ericsson; R1-091314, Mar. 2009, 8 pages.
"Restriction Requirement", U.S. Appl. No. 13/721,771, Mar. 16, 2015, 5 pages.
"Restriction Requirement", U.S. Appl. No. 14/031,739, Apr. 28, 2015, 7 pages.
"Signalling Support for PRS Muting in", 3GPP TSG RAN2 #70, Montreal, Canada; Ericsson, ST-Ericsson; R2-103102, May 2010, 2 pages.
"Some Results on DL-MIMO Enhancements for LTE-A", 3GPP TSG WG1 #55bis, R1-090328, Motorola; Ljubjana, Slovenia, Jan. 2009, 5 pages.
"Sounding RS Control Signaling for Closed Loop Antenna Selection", 3GPP TSG RAN #51, R1-080017—Mitsubishi Electric, Jan. 2008, 8 pages.
"Study on hearability of reference signals in LTE positioning support", 3GPP TSG RAN1 #56bisa—R1-091336, Seoul, South Korea, Mar. 2009, 8 pages.
"Supplemental Notice of Allowance", U.S. Appl. No. 14/488,709, Oct. 7, 2015, 8 pages.
"System Simulation Results for OTDOA", 3GPP TSG RAN WG4 #53, Jeju, South Korea, Ericsson, R4-094532;, Nov. 2009, 3 pages.
"Technical 1 34. Specification Group Radio Access Network; Evolved Universal Terrestrial Radio Access (E-UTRA);", 3GPP TS 36.211 v8.4.0 (Sep. 2008); 3rd Generation Partnership Project; Physical Channels and Modulation (Release 8), 2008, 78 pages.
"Technical Specification Group Radio Access Network", 3GPP TS 25.305 V8.1.0 (Dec. 2008) 3rd Generation Partnership Project; Stage 2 functional specification of User Equipment (UE) positioning in Utran (Release 8), 2008, 79 pages.
"Technical Specification Group Radio Access Network; Evolved Universal Terrestrial Radio Access (E-UTRA)", 3GPP TS 36.305 V0.2.0 (May 2009) 3rd generation Partnership Project; Stage 2 functional specification of User Equipment, (UE) positioning in E-UTRAN (Release 9);, 2010, 52 pages.
"Text 1 3 0. proposal on Orthonogonal PRS transmissions in mixed CP deployments using MBSFN subframes", 3GPP TSG RAN WG1 #59, Jeju, South Korea, Motorola, R1-095003;, Nov. 2009, 4 pages.
"Text proposal on measurements", 3GPP TSG RAN2 #60bis, Tdoc R2-080420; Motorola, Sevilla, Spain, Jan. 2008, 9 pages.
"Two Component Feedback Design and Codebooks", 3GPP TSG RAN1 #61, R1-103328, Motorola, Montreal, Canada, May 2010, 7 pages.
"Two-Level Codebook design for MU MIMO enhancement", 3GPP TSG RAN WG1 #60, R1-102904, Montreal, Canada, May 2010, 8 pages.
"UTRAN SFN-SFN observed lime 11 difference measurement & 3GPP TS 25.311 IE 10.3.7.106 "UE positioning OTDOA neighbor cell info' assistance data D fields"", 3GPP TSG RAN WG4 (Radio) #20, New Jersey, USA; Tdoc R4-011408,, Nov. 2001, 4 pages.

(56) References Cited

OTHER PUBLICATIONS

"View on the feedback framework for Rei. 1 0", 3GPP TSG RAN WG1 #61, R1-103026, Samsung, Montreal, Canada, May 2010, 15 pages.
"Views on Codebook Design for Downlink 8Tx MIMO", 3GPP TSG RAN WG1 #60. R1-101219, San Francisco, USA, Feb. 2010, 9 pages.
Colin,"Restrictions on Autonomous Muting to Enable 1 58. Time Difference of Arrival Measurements", U.S. Appl. No. 61/295,678, filed Jan. 15, 2010, 26 pages.
Costas,"A Study of a Class of Detection Waveforms Having Nearly Ideal Range-Doppler Ambiguity Properties", Fellow, IEEE; Proceedings of the IEEE, vol. 72, No. 8, Aug. 1984, 14 pages.
Guo,"A Series-Shunt Symmetric Swtich Makes Transmit-Receive Antennas Reconfigurable in Multipath Channels", IEEE 3d Int'l Conf. on Digital Object Identifier, May 29, 2011, pp. 468-471.
Jafar,"On Optimality of Beamforming for Multiple Antenna Systems with Imperfect Feedback", Department of Electrical Engineering, Stanford University, CA, USA, 2004, 7 pages.
Knoppert,"Communication Device", U.S. Appl. No. 29/329,028, filed Dec. 8, 2008, 10 pages.
Knoppert,"Indicator Shelf for Portable Electronic Device", U.S. Appl. No. 12/480,289, filed Jun. 8, 2009, 15 pages.
Krishnamurthy,"Interference Control, SINR Optimization and Signaling Enhancements to Improve the Performance of OTDOA Measurements", U.S. Appl. No. 12/813,221, filed Jun. 10, 2010, 20 pages.
Krishnamurthy,"Threshold Determination in TDOA-Based Positioning System", U.S. Appl. No. 12/712,191, filed Feb. 24, 2010, 19 pages.
Li,"A Subband Feedback Controlled Generalized Sidelobe Canceller in Frequency Domain with Multi-Channel Postfilter", 2nd International Workshop on Intelligent Systems and Applications (ISA), IEEE, May 22, 2010, 4 pages.
MACCM"GaAs SP6T 2.5V High Power Switch Dual-/Tri-/Quad-Band GSM Applications", Rev. V1 data sheet, www.macomtech.com, Mar. 22, 2003, 5 pages.
Renesas,"uPG2417T6M GaAs Integrated Circuit SP6T Switch for NFC Application (R09DS0010EJ0100)", Rev. 1.00 data sheet, Dec. 24, 2010, 12 pages.
Sayana,"Method of Codebook Design and Precoder Feedback in Wireless Communication Systems", U.S. Appl. No. 61/374,241, filed Aug. 16, 2010, 40 pages.
Sayana,"Method of Precoder Information Feedback in Multi-Antenna Wireless Communication Systems", U.S. Appl. No. 61/331,818, filed May 5, 2010, 43 pages.
Tesoriero,"Improving Location Awareness in Indoor Spaces Using RFID Technology", ScienceDirect, Expert Systems with Applications, 2010, 894-898.
Valkonen,"Impedance Matching and Tuning of Non-Resonant Mobile Terminal Antennas", Aalto University Doctoral Dissertations, Mar. 15, 2013, 94 pages.
Visotsky,"Space—Time Transmit Precoding With Imperfect Feedback", IEEE Transactions on Information Theory, vol. 47, No. 6, Sep. 2001, pp. 2632-2639.
Vodafone"PDCCH Structure for MTC Enhanced Coverage", 3GPP TSG RAN WG1 #76, R1-141030, Prague, Czech Republic, Feb. 2014, 2 pages.
Yun,"Distributed Self-Pruning(DSP) Algorithm for Bridges in Clustered Ad Hoc Networks", Embedded Software and Systems; Lecture Notes in Computer Science, Springer, May 14, 2007, pp. 699-707.
Zhuang,"Method for Precoding Based on Antenna Grouping", U.S. Appl. No. 12/899,211, filed Oct. 6, 2010, 26 pages.
"Coverage enhancement for RACH messages", 3GPP TSG-RAN WG1 Meeting #76, R1-140153, Alcatel-Lucent, Alcatel-Lucent Shanghai Bell, Feb. 2014, 5 pages.
"Coverage Improvement for PRACH", 3GPP TSG RAN WG1 Meeting #76—R1-140115, Intel Corporation, Feb. 2014, 9 pages.
"International Search Report and Written Opinion", Application No. PCT/US2015/033570, Oct. 19, 2015, 18 pages.
"On the need of PDCCH for SIB, RAR and Paging", 3GPP TSG-RAN WG1 #76—R1-140239, Feb. 2014, 4 pages.
"Specification Impact of Enhanced Filtering for Scalable UMTS", 3GPP TSG RAN WG1 Meeting #76, R1-140726, QUALCOMM Incorporated, Feb. 2014, 2 pages.
"Written Opinion", Application No. PCT/US2013/071616, Jun. 3, 2015, 9 pages.
Yu-chun,"A New Downlink Control Channel Scheme for LTE", Vehicular Technology Conference (VTC Spring), 2013 IEEE 77th, Jun. 2, 2013, 6 pages.
"Non-Final Office Action", U.S. Appl. No. 13/733,297, Feb. 2, 2016, 17 pages.
"Non-Final Office Action", U.S. Appl. No. 14/280,775, Mar. 23, 2016, 11 pages.
"Non-Final Office Action", U.S. Appl. No. 14/330,317, Feb. 25, 2016, 14 pages.
"Non-Final Office Action", U.S. Appl. No. 14/339,476, Jan. 20, 2016, 9 pages.
"Notice of Allowance", U.S. Appl. No. 13/873,557, Apr. 11, 2016, 5 pages.
"Notice of Allowance", U.S. Appl. No. 14/031,739, Mar. 1, 2016, 7 pages.
"Notice of Allowance", U.S. Appl. No. 14/052,903, Feb. 1, 2016, 8 pages.
"Notice of Allowance", U.S. Appl. No. 14/952,738, Mar. 28, 2016, 7 pages.
"Corrected Notice of Allowance", U.S. Appl. No. 14/339,476, Sep. 13, 2016, 2 pages.
"Corrected Notice of Allowance", U.S. Appl. No. 14/339,476, Sep. 30, 2016, 2 pages.
"Advisory Action", U.S. Appl. No. 13/692,520, Sep. 6, 2016, 3 pages.
"Corrected Notice of Allowance", U.S. Appl. No. 14/031,739, Jun. 8, 2016, 2 pages.
"Final Office Action", U.S. Appl. No. 13/692,520, May 26, 2016, 25 pages.
"Final Office Action", U.S. Appl. No. 13/733,297, Jul. 18, 2016, 17 pages.
"Final Office Action", U.S. Appl. No. 13/955,723, Jun. 16, 2016, 31 pages.
"Final Office Action", U.S. Appl. No. 14/330,317, Jun. 16, 2016, 15 pages.
"Final Office Action", U.S. Appl. No. 14/445,715, Jul. 8, 2016, 31 pages.
"Notice of Allowance", U.S. Appl. No. 14/280,755, Jul. 15, 2016, 5 pages.
"Notice of Allowance", U.S. Appl. No. 14/339,476, Jul. 18, 2016, 11 pages.
"Supplemental Notice of Allowance", U.S. Appl. No. 14/031,739, Apr. 21, 2016, 2 pages.
"Supplemental Notice of Allowance", U.S. Appl. No. 14/952,738, Jun. 9, 2016, 4 pages.
"Non-Final Office Action", U.S. Appl. No. 13/721,771, May 31, 2016, 9 pages.
"Non-Final Office Action", U.S. Appl. No. 14/445,715, Oct. 20, 2016, 43 pages.
"Notice of Allowance", U.S. Appl. No. 13/721,771, Oct. 26, 2016, 5 pages.
"Non-Final Office Action", U.S. Appl. No. 13/692,520, Nov. 17, 2016, 7 pages.

\* cited by examiner

METHOD AND APPARATUS FOR DETERMINING DIRECTION INFORMATION FOR A WIRELESS DEVICE

RELATED APPLICATION

The present application is related to and claims the benefit under 35 U.S.C. §119(e) of the following U.S. Provisional Patent Application: Ser. No. 61/918,547, filed Dec. 19, 2013, titled "Method and Apparatus for Determining Direction Information for a Wireless Device", which is commonly owned with this application by Motorola Mobility, Inc., and the entire contents of which is incorporated herein by reference.

FIELD OF THE DISCLOSURE

The present disclosure relates generally to determining relative directions of wireless devices and more particularly to determining relative directions of wireless communication devices using beamforming antennas.

BACKGROUND

Mobile electronic devices, such as smartphones and tablets, continue to evolve through increasing levels of performance and functionality as manufacturers design feature-rich products that offer consumers greater convenience and productivity. Today, a single smartphone can operate as a phone, two-way radio, media player, web browser, global-positioning-system receiver, camera, personal digital assistant, gaming device, and remote control where separate, dedicated devices would have been required at the turn of the century. Supporting these mobile devices are ubiquitous wireless devices of varying type and purpose with which the mobile devices can operate to expand their functionality.

Given congestion of radio traffic from these many wireless devices in certain locations, such as urban environments, it can be difficult for a mobile device to discriminate one wireless device from another or to identify a wireless device with which to connect. Moreover it can be difficult for a user of a mobile device to locate specific electronic resources or peer device when the mobile device lacks the capability to determine directions for detected wireless devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
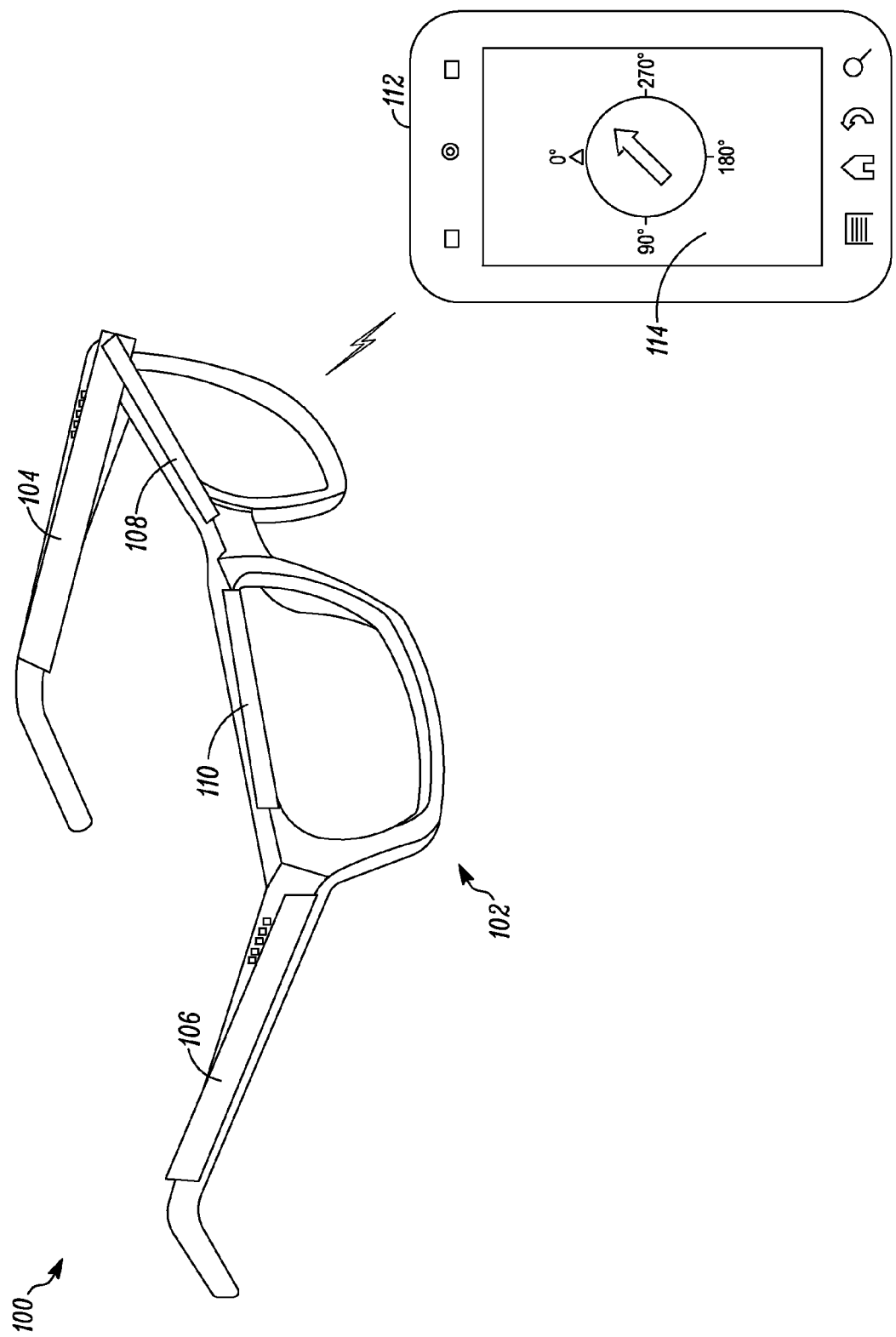
FIG. 1 is a diagram of eyewear and a mobile device in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for determining direction information for wireless devices. In accordance with the teachings herein, a method performed by eyewear for determining direction information for a wireless device includes scanning at least one of multiple radio frequencies using at least two beamforming antennas of a plurality of beamforming antennas coupled to the eyewear, and detecting, on a first scanned radio frequency, first externally emitted radio energy. The method further includes identifying a first wireless device using the detected first externally emitted radio energy and determining a first direction of the first wireless device relative to the eyewear.

Also in accordance with the teachings herein is eyewear configured for determining direction information for a wireless device, the eyewear including an eyewear frame and an antenna arrangement having a plurality of beamforming antennas attached to the eyewear frame and coupled to an antenna control module, which is configured to control the plurality of beamforming antennas. The eyewear further includes a transceiver coupled to the antenna arrangement and configured to receive radio signals using the plurality of beamforming antennas. The eyewear has a processing element coupled to the antenna arrangement and the transceiver, wherein the processing element is configured to cooperatively operate with the antenna arrangement and the transceiver to scan multiple radio frequencies using at least two beamforming antennas of the plurality of beamforming antennas and detect, on a first scanned radio frequency, first externally emitted radio energy. The processing element of the eyewear is further configured to identify a first wireless device using the first externally emitted radio energy and determine direction information for the first wireless device.

By equipping an apparatus, such as eyewear, with a plurality of beamforming antennas that can simultaneously scan multiple directions and/or frequencies, the apparatus can detect, distinguish between, and identify multiple wireless devices in a shorter amount of time as compared to a smartphone, for example. Further, where the smartphone only has an omnidirectional antenna, the smartphone is unable to differentiate between numerous signals of similar frequency originating from multiple wireless devices located in different directions. By using its plurality of beamforming antennas, the apparatus also determines direction information for the detected wireless device relative to itself. This direction information is used by the apparatus, or communicated to another coupled apparatus, to improve functionality and performance of the apparatus and to make intelligent selections with regard to connecting with wireless devices based on their relative directions.

Referring now to the drawings, and in particular FIG. 1, two devices implementing embodiments in accordance with the present teachings are shown and indicated generally at 100. The first device represents eyewear 102 that includes a frame to which a plurality of beamforming antennas are attached. Specifically, a first 104, second 108, third 110, and fourth 106 beamforming antennas are shown attached to the eyewear 102 in a specific antenna arrangement. An antenna arrangement, as used herein, refers to how beamforming antennas are positioned spatially on eyewear to operate individually or together to detect radio energy.

As defined herein, eyewear is any apparatus designed to be worn on about the head in a hands-free configuration that has a structure to which a plurality of beamforming antennas are attached. The second device indicated at 112 is an optional mobile device that is communicatively coupled to the eyewear 102. The mobile device 112 shown is a cellular phone having a display 114 on which a direction, relative to the direction the eyewear is facing, is displayed. As used herein, a mobile device is any portable electronic device, such as a smartphone, tablet, or phablet, for example, that is capable of establishing a communication link to the eyewear 102 and establishing a wireless data connection to at least one other electronic device.

Figure 2:
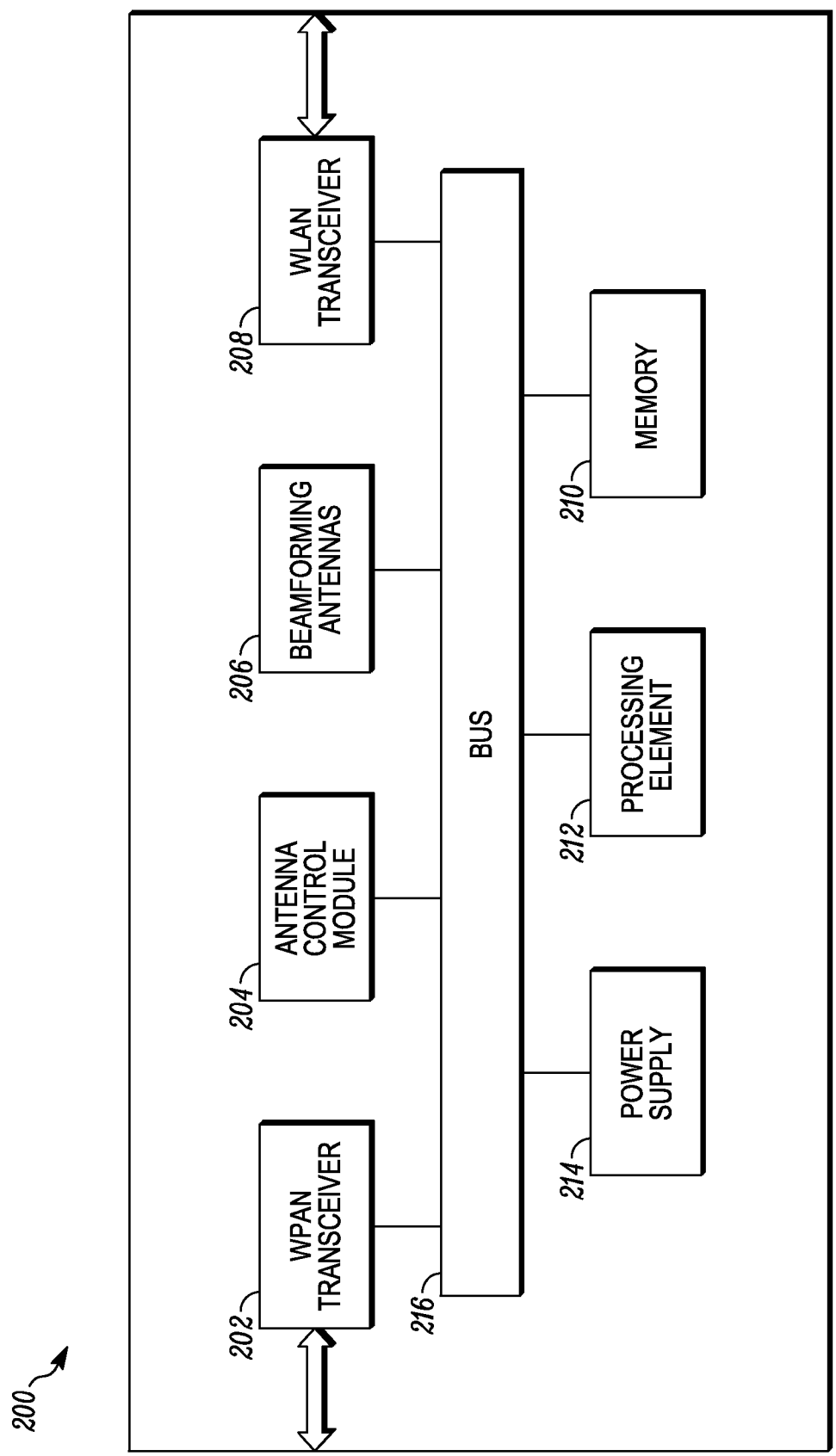
FIG. 2 is a schematic diagram of eyewear in accordance with some embodiments of the present teachings.

Referring to FIG. 2, a block diagram for eyewear in accordance with embodiments of the present teachings is shown and indicated generally at 200. For one embodiment, the block diagram 200 represents the eyewear 102. Specifically, the block diagram 200 shows: a wireless personal-area network (WPAN) transceiver 202, an antenna control module 204, beamforming antennas 206 (e.g., 104, 106, 108, 110), a wireless local-area network (WLAN) transceiver 208, memory 210, a processing element 212, and a power supply 214, which are all operationally interconnected by a bus 216.

A limited number of eyewear elements 202, 204, 206, 208, 210, 212, 214 and 216 are shown at 200 for ease of illustration, but other embodiments may include a lesser or greater number of such elements in eyewear. Moreover, other elements needed for a commercial embodiment of eyewear that incorporates the elements shown at 200 are omitted from FIG. 2 for clarity in describing the enclosed embodiments. Such additional elements might include, for example: an angular motion detector, such as a gyroscope; a heads-up display; an acoustic transducer; and a micro switch and/or sensor to give the eyewear 102 the capability to detect whether it is unfolded and being worn or folded and not being worn.

We turn now to a brief description of the eyewear elements shown in the block diagram 200. In general, the beamforming antennas 206, in addition to the antenna control module 204 and the processing element 212, are configured with functionality in accordance with embodiments of the present disclosure as described in detail below with respect to the remaining FIGS. 3-7. "Adapted," "operative" or "configured," as used herein, means that the indicated elements are implemented using one or more hardware devices such as one or more operatively coupled processing cores, memory devices, and interfaces, which may or may not be programmed with software and/or firmware as the means for the indicated elements to implement their desired functionality. Such functionality is supported by the other hardware shown in FIG. 2, including the system elements 202, 208, 210, and 214.

Continuing with the brief description of the system elements shown at 200, as included within the eyewear 102, the WPAN transceiver 202 allows the eyewear to establish a wireless connection and communicate with a mobile device, assumed to be the mobile device 112 for the embodiments described herein. The eyewear 102 used the WPAN transceiver 202 to at least provide to the mobile device 112 direction information for wireless devices as described herein. For a particular embodiment, the WPAN transceiver 202 is a Bluetooth transceiver that allows the eyewear 102 to pair and communicate with the mobile device 112, which is also a Bluetooth capable device. A Bluetooth capable device, as used herein, is a device that contains hardware and/or software that configures the device to perform a standard Bluetooth pairing with another Bluetooth capable device, in accordance with the Bluetooth wireless communication standard, and to establish communications over a Bluetooth connection with that device. The Bluetooth wireless communication standard is defined by the Bluetooth Special Interest Group (SIG) Core Specification version 4.1 dated Dec. 3, 2013, in addition to any previous and subsequent versions. In other embodiments, the WPAN transceiver 202 allows the eyewear 102 to communicate with the mobile device 112 using communication protocols based on other personal-area network protocols, such as the 2.4 GHz ZigBee protocols based on the Institute of Electrical and Electronics Engineers (IEEE) 802.15 standard, the short-range 60 GHz IEEE 802.11ad protocol, and other short-range wireless protocols. In an alternative embodiment, the eyewear 102 includes a wired interface and is directly connected to the mobile device 112.

The WLAN transceiver 208 allows the eyewear 102 to send and receive radio signals to and from similarly equipped electronic devices using a wireless distribution method, such as a spread-spectrum or orthogonal frequency-division multiplexing (OFDM) method. For embodiments, the WLAN transceiver 208 uses an IEEE 802.11 standard to communicate with other electronic devices in the 2.4, 3.6, 5, and 60 GHz frequency bands. In a particular embodiment, the WLAN transceiver 208 uses Wi-Fi interoperability standards as specified by the Wi-Fi Alliance to communicate with other Wi-Fi certified devices. Other IEEE 802.11-compliant devices with which the eyewear 102 can communicate include, but are not limited to: wireless access points (WAPs), peer devices, and electronic resources. For example, the WLAN transceiver 208 allows the eyewear 102 to link with WAPs that provide Internet connections, to locate electronic resources such as wireless printers, and to communicate with mobile devices other than the mobile device 112 to which the eyewear is connected using the WPAN transceiver 202. In an alternate embodiment, hardware element 208 is a receiver that receives radio signals but does not transmit them.

The beamforming antennas 206 allows the eyewear 102 to employ directional selectivity when receiving and transmitting radio signals from and to other electronic devices. For an embodiment, individual reception and transmission elements within each beamforming antenna are controlled by the antenna control module 204 as a phased array to generate a constructive interference pattern that favors an intended direction of reception and transmission. A more detailed description of the beamforming antennas 206 and the antenna control module 204, as they are used in connection with the present teachings, is provided with reference to FIG. 3.

The processing element 212 represents one or more processing cores and includes arithmetic logic and registers necessary to perform the digital processing required by the antenna control module 204 to control and operate the beamforming antennas 206 in a manner consistent with the embodiments described herein. For a particular embodiment, the processing element 212 is implemented as a system-on-chip (SoC).

The memory 210 provides temporary storage of electronic data used by the processing element 212 in performing its functionality. For one embodiment, the memory 210 represents random access memory (RAM). For other embodiments, the memory 210 represents volatile or non-volatile memory used by the processing element 212 to cache data.

The power supply 214 supplies electric power to the eyewear elements, as needed, during the course of their normal operation. The power is supplied to meet the individual voltage and load requirements of the eyewear elements that draw electric current. The power supply 214 also powers up and powers down the eyewear 102. For a particular embodiment, the power supply includes a rechargeable battery.

Figure 3:
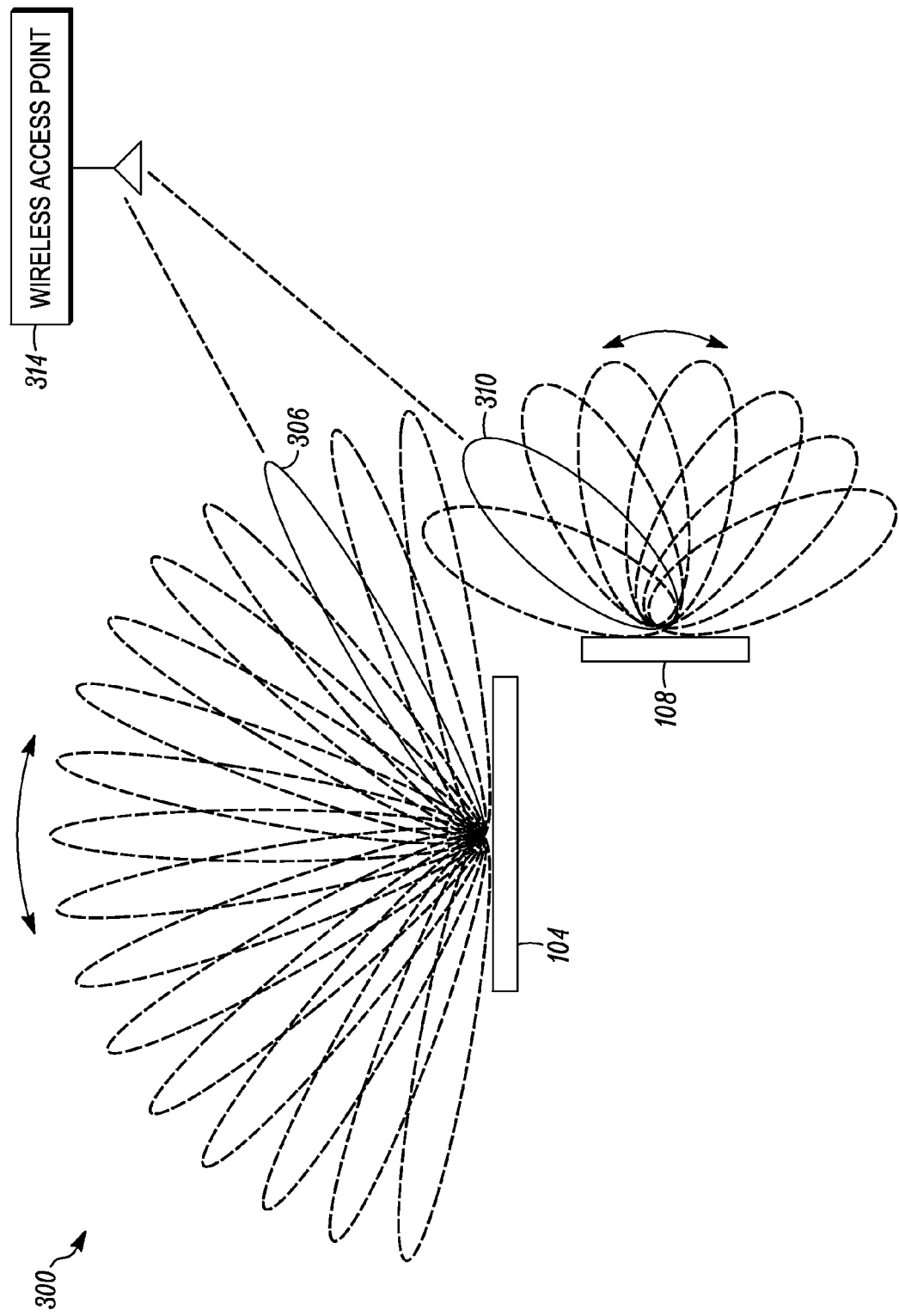
FIG. 3 is a schematic of beamforming antennas in accordance with some embodiments of the present teachings.

FIG. 3 shows a schematic diagram 300 illustrating an operation of the beamforming antennas 206 in accordance with the teachings of the present disclosure. In particular, the first 104 and second 108 beamforming antennas of FIG. 1 are shown operating together to determine a direction of a wireless device, in this case a WAP 314. By controlling the relative phase between beamforming elements of the first beamforming antenna 104 as a function of time, the antenna control module 204 creates a dynamic interference pattern for the first beamforming antenna 104 that results in a detection beam 306 that sweeps out an arc to scan for radio signals. As shown, the detection beam 306 scans directions in front of the first beamforming antenna 104 over an angular range of approximately 180 degrees. In other embodiments, or in other modes, the range is restricted. For one embodiment, an inverse detection beam to the detection beam 306 also allows the first beamforming antenna 104 to scan behind itself. In another embodiment, a backing is applied to the first beamforming antenna 104, and to other beamforming antennas of the eyewear 102, to block radio energy. Blocking radio energy becomes important when the beamforming antenna 104 is transmitting to protect users wearing the eyewear 102 from radio emissions.

As the detection beam 306 sweeps out an arc, the processing element 212 monitors the signal strength of detected radio energy. Where the signal strength is strongest, the detection beam 306 is directed toward the WAP 314. The directions of radio sources detected by the eyewear 102 are determined relative to the position of eyewear 102. For an embodiment, the processing element 212 can also make inferences as to the distance of the WAP 314 from the strength of the signal it detects.

In the embodiment shown, the second beamforming antenna 108 is also being used to scan for the WAP 314. By controlling the first 104 and second 108 beamforming antennas to both scan for the WAP 314, the direction of the WAP 314 is determined more quickly. By having the first 104 and second 108 beamforming antennas scan out of phase, there is a higher detection opportunity for burst transmissions. Further, the angular measure of the detection beam 310 can be used together with the angular measure of the detection beam 306 to determine the direction of the WAP 314 with greater accuracy or to triangulate an approximate distance of the WAP 314 from the eyewear 102.

For an embodiment, the processing element 212 is coupled to the antenna arrangement of the eyewear 102 and the WLAN transceiver 208 to cooperatively operate with the antenna arrangement and the WLAN 208 transceiver to scan for and detect externally emitted radio energy. Externally emitted radio energy, as defined herein, is one or more radio signals transmitted by an electronic device other than the eyewear 102, and other than the mobile device 112, to which the eyewear 102 is coupled using the WPAN transceiver 202. The processing element 212 can also control the antenna control module 204 to control beamforming antennas 104, 106, 108, 110 of the antenna arrangement to scan for radio energy independently of one another. For example, the first beamforming antenna 104 scans for radio energy on a channel of a 2.4 GHz WLAN 802.11 band while the second beamforming antenna 108 contemporaneously scans for radio energy on a channel of a 5 GHz WLAN 802.11 band. As the beamforming antennas 104, 108 detect radio energy of different frequencies being emitted by different wireless devices, each beamforming antenna is independently controlled to determine a direction for one or more of the wireless devices. In a further embodiment, the processing element 212 also uses the beamforming antennas 104, 108 to identify the wireless devices.

Identifying a wireless device, as used herein, means to resolve, distinguish, or differentiate a single wireless device as a source of detected radio energy and to ascertain one or more definitive characteristics of the wireless device beyond the direction of the wireless device and the frequency at which the wireless device is transmitting. In a first example, the eyewear 102, or more specifically, the processing element 212 of the eyewear 102, identifying a wireless device includes the eyewear 102 ascertaining that the wireless device is a WAP and further determining at least one of: a service provider, a host, a service set identifier (SSID), or an Internet Protocol (IP) address for the WAP. In a second example, the eyewear 102 identifying a WAP includes the eyewear 102 ascertaining information necessary for the eyewear 102, or the mobile device 112 communicatively coupled to the eyewear 102, to establish an Internet connection using the WAP. In a third example, the eyewear identifying a wireless device includes the eyewear 102 ascertaining that the wireless device is a peer device and further that the peer device belongs to a user indicated on a friends list. In a fourth example, the eyewear identifies an electronic device as a particular electronic resource, such as a public printer.

Figure 4:
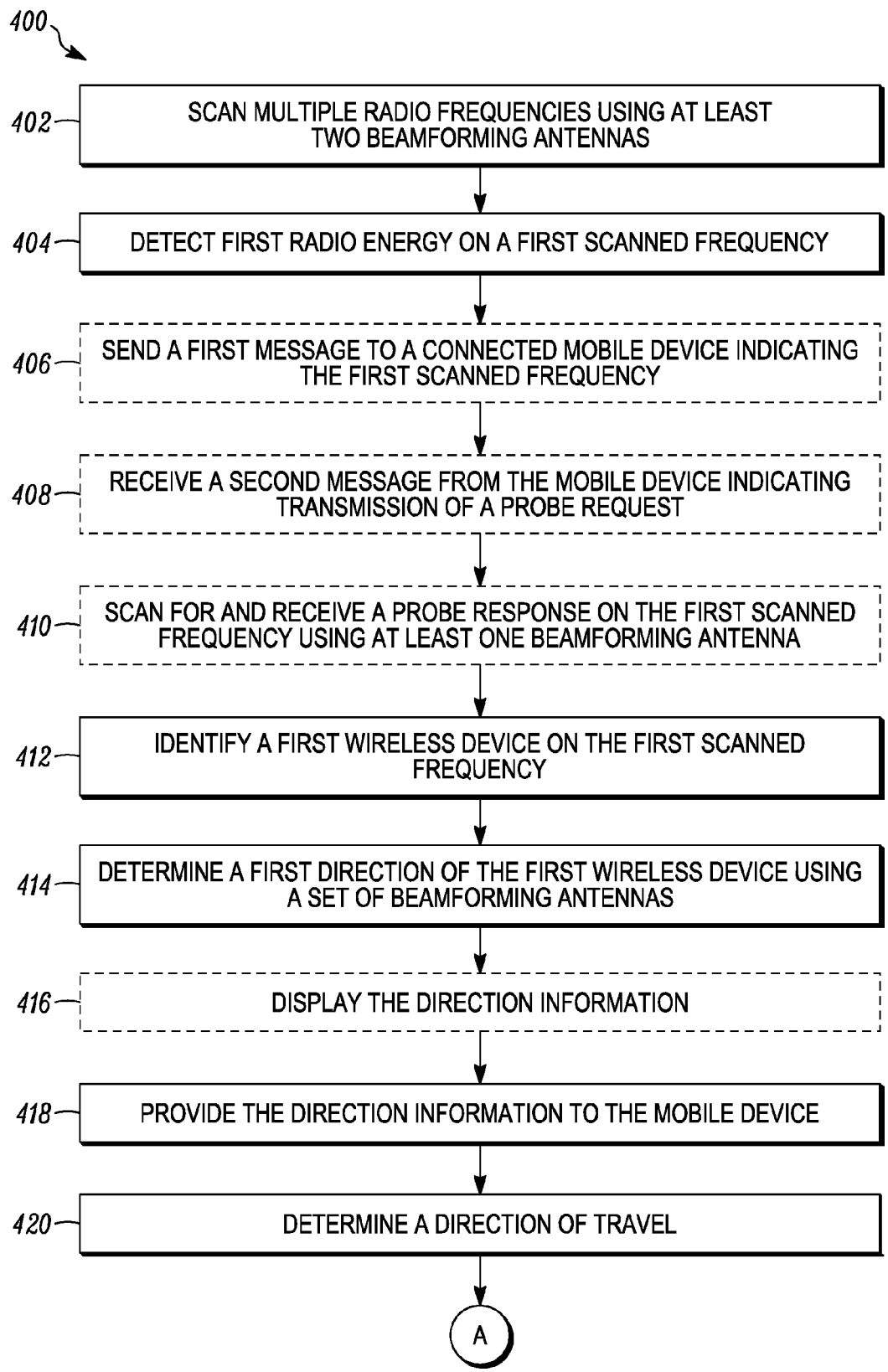
FIG. 4 is a logical flowchart illustrating a method performed by eyewear for determining direction information for wireless devices in accordance with some embodiments of the present teachings.
Figure 5:
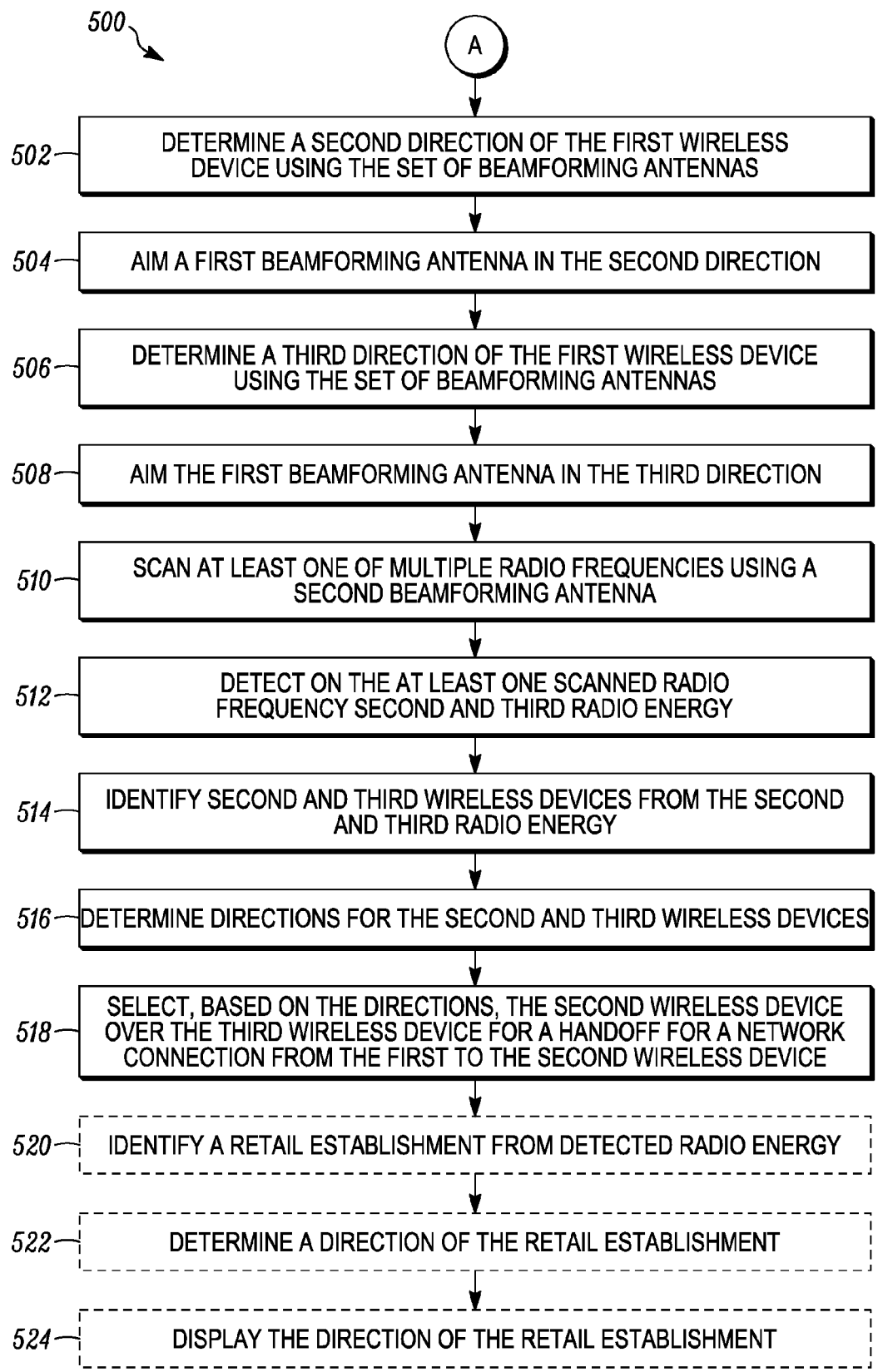
FIG. 5 is a logical flowchart illustrating a method performed by eyewear for determining direction information for wireless devices accordance with some embodiments of the present teachings.

We turn now to a detailed description of the functionality of the eyewear 102 and the eyewear elements shown in FIGS. 1 and 2 at 100 and 200, respectively, in accordance with the teachings herein and by reference to the remaining figures. FIGS. 4 and 5 show a first 400 and second 500 portion of a logical flow diagram that illustrates a method performed by the eyewear 102 for determining direction information for wireless devices. The method includes the eyewear 102 looking for radio activity by scanning 402 multiple frequencies using at least two beamforming antennas of the plurality of beamforming antennas 206. In one embodiment, each beamforming antenna scans a different channel of a same WLAN 802.11 band. In another embodiment, each beamforming antenna scans within a different WLAN 802.11 band.

For a particular embodiment, a beamforming antenna is used to detect radio traffic within a band more quickly by taking advantage of band-channel overlap to skip channels while scanning for externally emitted radio energy. For example, in the 2.4 GHz WLAN 802.11 band, each channel is overlapped by its four nearest neighboring channels. The first beamforming antenna 104 is used to scan channels 1, 6, and 11. If radio energy is detected on channels 1 and 6, the eyewear also scans channels 2, 3, 4, and 5 to determine the channel being used to transmit the detected radio energy.

From a first detected 404 energy on a first scanned frequency or channel, the eyewear 102 identifies 412 a first wireless device transmitting on the first scanned frequency or channel. The eyewear identifies the first wireless device by monitoring the first frequency for a beacon frame transmitted by the first wireless device. Alternatively, in an optional embodiment, the eyewear 102 identifies 412 the first wireless device by monitoring the first frequency for a probe response from the first wireless device. Using its WPAN transceiver 202, the eyewear 102 sends 406 a first message to the mobile device 112 that indicates the first scanned frequency on which the wireless device is transmitting. The mobile device 112 then sends out a probe request on the first frequency and sends a second message back the eyewear 102 indicating transmission of the probe request. The eyewear 102 receives 408 the indication of the probe request sent by the mobile device on the first scanned radio frequency and scans 410 the first frequency, using at least one of the beamforming antennas 206, for a probe response sent by the first wireless device. The eyewear 102 then identifies 412 the first wireless device from the probe response.

In a particular instance, multiple wireless devices operating on the first frequency respond to the probe request transmitted by the mobile device 112 at the same time. Having an omnidirectional antenna, the mobile device 112 is unable to discriminate between the multiple probe responses and perceives signal clutter as a result. The eyewear 102, however, can scan for multiple probe responses by training multiple beamforming antennas 206 in different directions. When the multiple probe responses are received, the eyewear 102 can discriminate between them and identify the individual wireless devices operating on the first frequency and also determine their directions relative to the eyewear 102.

The eyewear 102 provides 418 the first direction of the first wireless device to a mobile device 112 communicatively coupled to the eyewear for establishing a connection between the mobile device 112 and the first wireless device. In the instance that the eyewear 102 identifies multiple wireless devices, it also provides the mobile device 112 with relative directions to the other wireless devices. The direction information the eyewear 102 provide the mobile device 112 can be explicit or implicit. In a first embodiment, the eyewear 102 provides the mobile device 112 with a list of detected WAPs and their directions relative to a direction of travel for the eyewear 102. In a second embodiment, the eyewear 102 provides the mobile device 112 with an ordered list of the detected WAPs in which the WAPs are listed in order of alignment with a direction of travel for the eyewear 102 without including explicit direction information. The second WAP 616 is prioritized over the third WAP 618 in the ordered list based on the second direction 626 being more closely aligned with the direction of travel than the third direction 618. In embodiments consistent with the teachings herein, the eyewear 102 also provides the mobile device 112 with additional information on detected WAPs, including, but not limited to SSIDs and received signal strength indicators (RRSIs).

Continuing the assumption that the identified wireless devices are WAPs, the mobile device 112 establishes a connection with the first WAP based on the direction preference information received from the eyewear 102. Of multiple WAPs, the direction of the first WAP, for example, might be most closely aligned with the direction of travel for the eyewear 102. Because the mobile device 122 is carried by a user with the eyewear 102, the direction of travel for the eyewear 102 is also the direction of travel for the mobile device 112. The direction of travel is specifically the direction in which the eyewear 102 and the mobile device 112 are moving. Because the direction of travel periodically changes, the eyewear 102 repeatedly determines 420 or monitors the direction of travel. The mobile device 112 is expected to maintain a longer connection with a WAP in the direction of travel because the mobile device 112 is moving toward the WAP.

As the eyewear 102 and the mobile device 112 move closer to the first WAP, the direction of the first WAP will change relative to the eyewear 102 (assuming the first WAP is not directly in front of the eyewear 102). The eyewear 102 uses a set of its beamforming antennas 206 to track the changing direction of the first WAP. As defined herein, a set includes one or more elements. The eyewear 102 maintains direction information for the first wireless device by determining 502, at a first time and using the set of beamforming antennas of the plurality of beamforming antennas 206, a second direction of the first wireless device relative to the eyewear and aiming 504 a first beamforming antenna of the plurality of beamforming antennas in the second direction. The eyewear 102 then determines 506, at a second time after the first time and using the set of beamforming antennas, a third direction of the first wireless device relative to the eyewear and changes 508 the aiming of the first beamforming antenna from the second direction to the third direction. In different embodiments, the third direction is determined in response to translational motion of the eyewear 102 relative to the first WAP and/or rotational motion of the eyewear 102.

As the eyewear 102 and the mobile device 112 continue to travel, they will eventually move past the first WAP. After this point, the first WAP falls behind the mobile device 112 as the mobile device 112 moves forward. In response to the eyewear 102 approaching and/or passing the first WAP, the eyewear begins to scan for replacement WAPs before the signal strength for the first WAP degrades to the point of diminished performance. In this way, the eyewear 102 is able to "anticipate" the need for a replacement WAP based on its direction of travel and the tracked direction of the first WAP relative to the eyewear 102 and thus improve on normal scanning procedures that are utilizing just signal strength and may not have enough time to select a replacement WAP before getting a degraded signal. In other embodiments, the eyewear 102 intermittently or continuously scans for new WAPs that might serve as "candidates" for a handoff based on, for example, signal strength, a preferred direction, a preferred service provider, or greater available bandwidth.

As the eyewear 102 continues to aim the first beamforming antenna of the plurality of beamforming antennas 206 at the first WAP, the eyewear 102 scans 510 at least one of multiple radio frequencies using a second beamforming antenna of the plurality of beamforming antennas 206 to detect 512 on at least one of the scanned radio frequencies, second and third externally emitted radio energy. The eyewear 102 then identifies 514 a second and third WAP using the detected second and third externally emitted radio energy, respectively. The eyewear 102 also determines 516 directions for the second and third WAP using one or more beamforming antennas 206. After receiving identity and direction information on the second and third WAP from the eyewear 102, the mobile device 112 selects 518 the second WAP instead of the third WAP for a handoff from the first WAP to the second WAP.

In an embodiment, the eyewear 102 continues to aim the first beamforming antenna at the first WAP to perform tasks involving the first WAP on behalf of the mobile device 112. If, for example, the mobile device 112 is receiving a video stream in real time, it can delegate the task of scanning the first WAP for data packets for the eyewear 102, leaving the mobile device 112 free to perform other functions.

Figure 6:
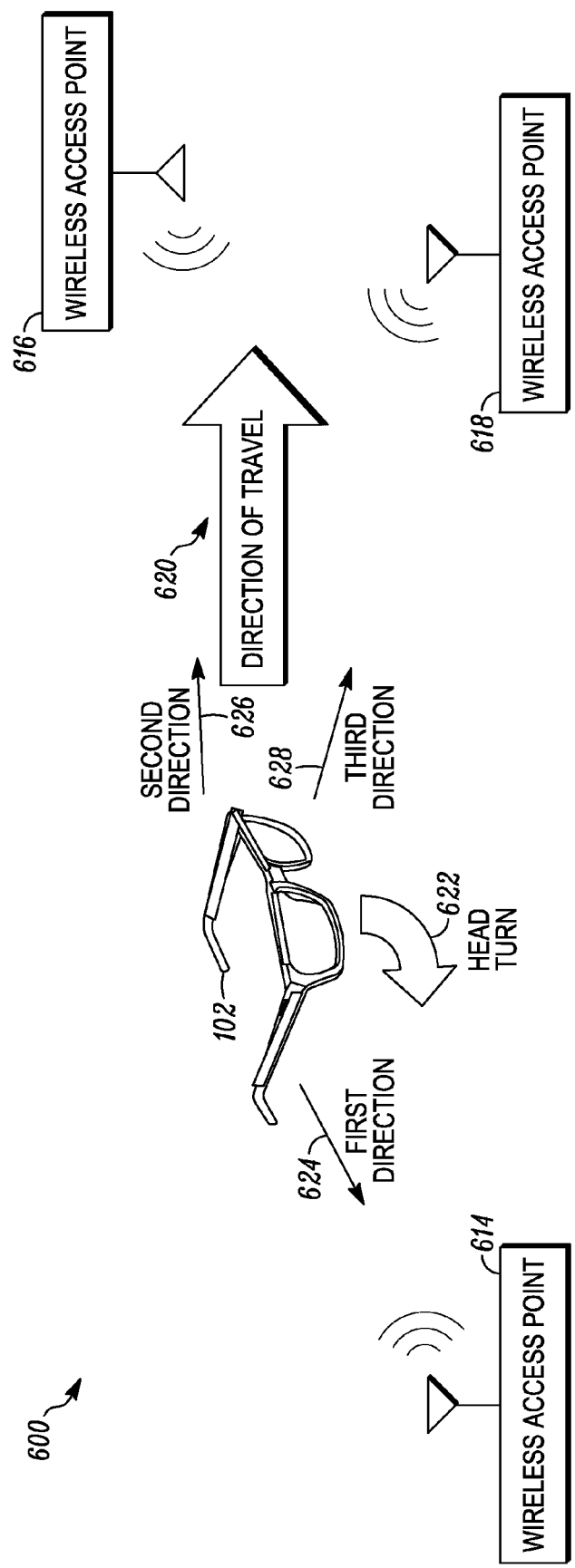
FIG. 6 is a schematic diagram of eyewear in motion relative to fixed wireless devices in accordance with some embodiments of the present teachings.

Turning momentarily to FIG. 6, selecting a WAP for a handoff is described in greater detail. FIG. 6 shows a schematic diagram 600 of the eyewear 102 in motion relative to fixed wireless devices in accordance with some embodiments of the present teachings. More particularly, FIG. 6 represents a "snapshot" in time that shows the eyewear 102 traveling away from a first WAP 614 and toward a second 616 and third 618 WAP. Not shown in the diagram 600 is the mobile device 112. While not explicitly indicated, the presence of the mobile device 112 communicatively coupled to the eyewear 102 is assumed for some embodiments. In other embodiments, the eyewear 102 establishes connections to one or more WAPs and operates autonomously, independent of any mobile device. As shown at 600, either the eyewear 102 or the mobile device 112 is connected to the first WAP 614 while the second 616 and third 618 WAPs are candidates for a handoff.

At a time that precedes the snapshot 600, the first WAP 614 is ahead of the eyewear 102 in the direction of travel 620 for the eyewear 102. It is assumed that either the eyewear 102 or the mobile device 112, if present, has an established connection with the first WAP 614. As the eyewear 102 closes its distance with the first WAP 614, it tracks the direction of the first WAP using one or more beamforming antennas 206 as described with reference to FIG. 3. The eyewear 102 determines that it has passed the first WAP 614 when it detects that a component of the direction to the first WAP 614 is antiparallel to the direction of travel 620. At this point, the eyewear 102 either begins to scan or scans more aggressively for additional WAPs that may have come into a range of detection for the eyewear 102 while the eyewear 102 was traveling. Scanning for a replacement WAP on at least one of multiple frequencies is based on the eyewear 102 detecting that it is traveling away from the first wireless device 614, which, baring a change in direction, indicates that a handoff will need to be performed due to the growing distance between the mobile device 112 and the connected WAP 614. As shown in the snapshot 600, the two additional WAPs 616, 618 are detected by the eyewear 102 when the direction to the connected WAP (i.e., the first direction 624 of the first WAP 614) is directed opposite to the direction of travel 620 for the eyewear 102. When the connected WAP 614 is behind the eyewear 102, the eyewear detects WAPs 616, 618 located ahead of itself, which become candidates for a handoff.

The eyewear 102 determines a second direction 626 to the second WAP 616 and a third direction 628 to the third WAP 618. The selection of a WAP for a handoff is based, in whole or in part, on the determined directions 626, 628. If the selection is made by the mobile device 112, then the eyewear 102 provides the mobile device 112 with the direction information for the first 616 and second 618 WAP. The eyewear 102 also determines or updates the direction of travel 620. In one embodiment, the eyewear 102 determines its direction of travel 620 by tracking the directions to fixed reference points, namely the first 614, second 616, and third 618 WAPs. For example, the eyewear 102 uses a set of beamforming antennas of the plurality of beamforming antennas 206 to determine a change in the first direction 624 of the first wireless access point relative to the eyewear 102 over an interval of time. In another embodiments, the eyewear 102 may be equipped with a Global Positioning System (GPS) receiver or determine its direction of travel 620 by referencing map data in connection with directions determined to identified wireless devices.

In different embodiments, the eyewear 102 or the mobile device 112 selects the second WAP 616 over the third WAP 618 for a handoff from the first WAP 614 based on the second direction 626 being more closely aligned with the direction of travel 620 than the third direction 628. For a particular embodiment, the eyewear selects the second WAP 616 over the third WAP 618 for a handoff from the first WAP 614 based on information in addition to direction information that the eyewear 102 received from the second 616 and third 618 WAPs during a scan. The processing element 212 of the eyewear assigns a weight to the direction information and selects the second WAP 616 for a handoff based on all the information the eyewear received.

For an embodiment in which the eyewear 102 is operating independently of any mobile device, the eyewear 102 establishes the connection to the first WAP 614. The eyewear 102 also scans at least one of multiple radio frequencies using a second beamforming antenna while it aims a first beamforming antenna in the first direction 626 at the first AP 614. From radio energy it detects, the eyewear 102 identifies and determines directions for the second 616 and third 618 WAP. The eyewear 102 determines its direction of travel 620 and selects, based on the second 626 and third 628 directions relative to the direction of travel 620, the second WAP 616 instead of the third WAP 618 for a handoff, by the eyewear 102, of the network connection from the first WAP 614 to the second WAP 616.

In another embodiment, the eyewear 102 displays the first direction 624 of the first WAP 614 on the eyewear 102. For example, the eyewear 102 determines that the signal strength for the first WAP 614 is weak due to the distance between the eyewear 102 and the first WAP 614. Moreover, the eyewear 102 is unable to perform a handoff because it does not have the necessary credentials to establish a connection with the first 616 or second 618 WAP. The eyewear 102 emits an audible tone alerting a user to the fact that the first WAP 614 is passing beyond range and that there are no alternative WAPs available. In this way the user may then decide whether to possibly lose the connection or adjust position to improve on the radio link quality. By displaying the first direction 624, on the lenses of the eyewear 102 in a heads-up configuration, for instance, the eyewear 102 guides the user toward the first WAP 614 to improve the quality of the connection with the first WAP 614.

The processing element 212 of the eyewear 102 can use directional information ascertained using one or more beamforming antennas 206 of the eyewear 102 to determine if a user of the eyewear 102 is turning his head. Further, the processing element 212 can process directional information to distinguish a head turn from translational motion of the eyewear 102. If a user turns his head 30 degrees to the right, as indicated at 622, the detected directions 624, 626, 628 for each of the fixed WAPs 614, 616, 618 shift to the left by the same 30 degrees, independent of the distance of any WAP from the eyewear 102. For translational motion of the eyewear 102, angular changes in the directions of WAPs relative to the eyewear 102 are dependent upon distances of the WAPs from the eyewear 102. As the eyewear passes two wireless devices to the left, for instance, the angular change in the direction of the closer of the two devices with respect to the eyewear 102 will be larger than for the farther device. The capability of the eyewear 102 to determine its direction of travel 620, even during the occurrence of frequent head turns, also allows the eyewear 102 to select a WAP that is aligned with the direction of travel for a handoff. In alternate embodiments, a head turn or the direction in which a user is looking weights the selection of a WAP for a handoff where the preference from the travel of direction might not otherwise distinguish them.

For one embodiment, the user is looking to his right relative to the direction he is traveling and the eyewear 102 responsively favors or prioritizes wireless devices that appear to the user's right over those that appear to the user's left. In a first example, the eyewear 102 detects that the user is walking away from the first WAP 614 to which it or an accompanying mobile device 112 is connected. The eyewear 102 begins to scan for a replacement WAP for a handoff and detects the second 616 and third 618 WAP. Instead of performing a handoff from the first 614 to the second 616 WAP, the eyewear 102 performs a handoff from the first 614 to the third 618 WAP. While the second direction 626 to the second WAP 616 is most closely aligned with the direction of travel 620, the third direction 628 of the third WAP 618 is most closely aligned with the direction the user is looking.

If the user changes his direction of travel to his right, the eyewear 102 can maintain a connection with the third WAP 618 for a longer period of time before moving out of range. If the eyewear 102 is communicatively coupled to the mobile device 112, the eyewear 102 will prioritize a detected WAP with a direction of 30 degrees to the right of the direction of travel 620, the direction in which the user is looking, over a detected WAP with a direction of 30 degrees to the left of the direction of travel 620 in a list of detected WAPs the eyewear 102 provides to the mobile device 112 as a candidate list for a handoff from the first WAP 614.

The candidate list the eyewear 102 provides the mobile device 112, which at a minimum includes direction information for detected WAPs, allows the mobile device 112 to make a higher quality selection for a handoff than if the mobile device 112 were operating without the added capability of the eyewear 102. For an embodiment, the selection is made by an algorithm running on the mobile device 112 that weighs direction information together with additional information regarding service providers, signal strength, and available bandwidth.

In other embodiments, the eyewear 102 alerts a user when the user is looking away from the direction of travel 620. The eyewear 102 detects from the rate at which directions to fixed wireless devices are changing that the user is traveling at a high rate of speed, for example, driving an automobile. The eyewear 102 further determines that the user has been looking away from the direction of travel 620 for more than a threshold amount of time, and consequently, emits an audible warning to the user. In one embodiment, a WAP or other radio source fixed at the front of the automobile near the steering wheel provides the eyewear 102 with a reference direction associated with the direction of travel 620. Using this reference direction, the eyewear alerts the user if the user looks away from the road or if the user's head starts to dip relative to the reference direction, indicating that the user is nodding off. The eyewear 102 gives an audible warning using a speaker of the eyewear 102 or using an audio system of the automobile when the eyewear is interfaced with the audio system.

Returning to FIG. 5, the eyewear 102 identifying a retail establishment using the detected first externally emitted radio energy and determining a direction of the retail establishment relative to the eyewear 102 using a set of beamforming antennas 206 of the eyewear 102 is indicated as an optional embodiment at 520 and 522, respectively. The eyewear 102 can then also display 524 a direction to the retail establishment to assist a user in finding it. In addition to locating retail establishments, the eyewear 102 can also scan for, identify, and determine relative directions to wireless devices associated with other types of establishments, such as office spaces, government buildings, and educational institutions. The eyewear 102 locating and determining directions for retail establishments and other wireless devices is described further with reference to FIG. 7.

Figure 7:
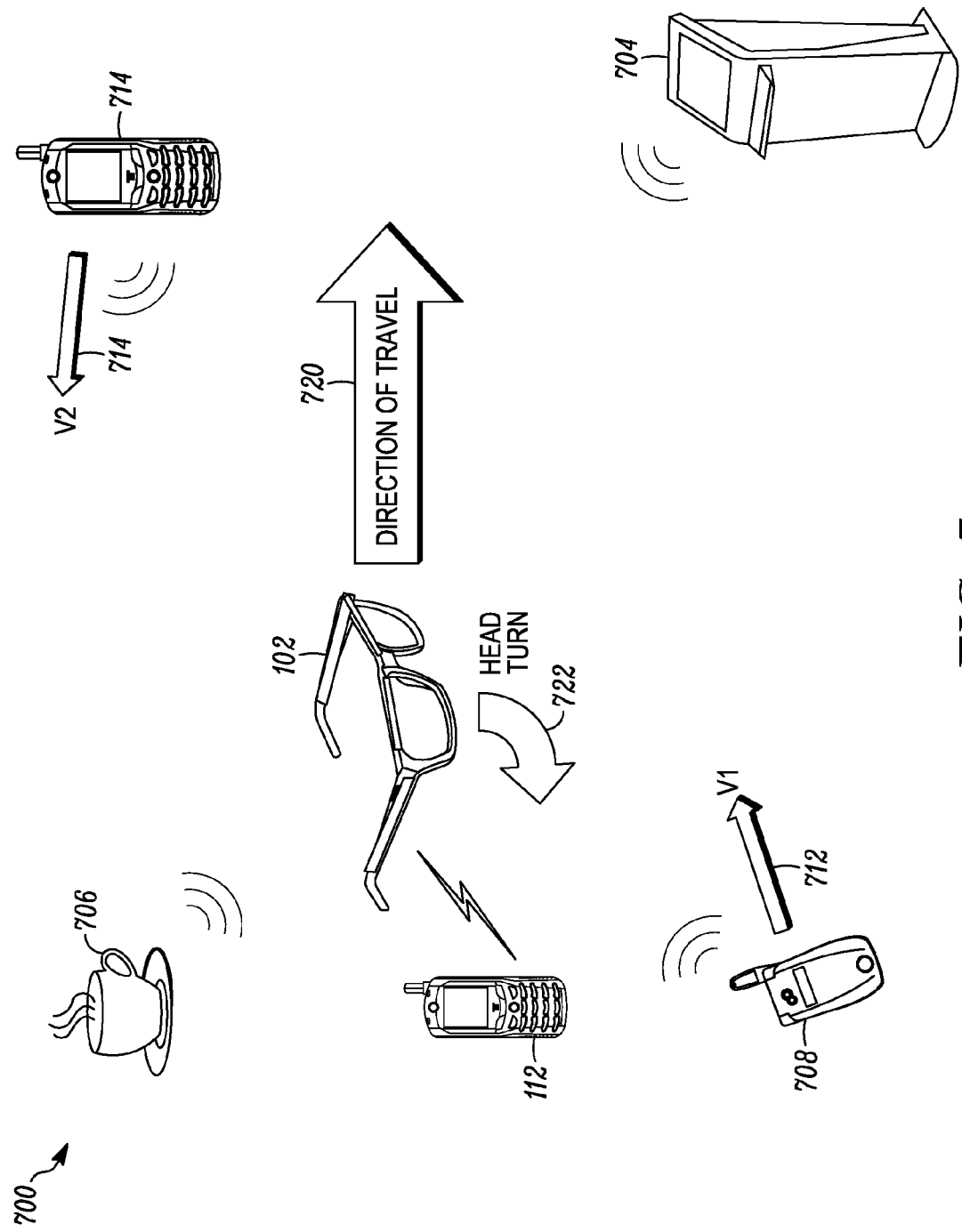
FIG. 7 is a schematic diagram of eyewear in motion relative to mobile and fixed wireless devices in accordance with some embodiments of the present teachings.

FIG. 7, shows a schematic diagram 700 that illustrates the eyewear 102 moving in a direction of travel 720 relative to other wireless devices, more specifically, a wireless device associated with a location such as a retail establishment, an electronic resource 704, and a first 708 and second 710 peer device, that are all within a range of detection for the eyewear 102. In describing embodiments with reference to the diagram 700, it is assumed that the eyewear 102 is communicatively coupled to, and operates with, the mobile device 112. For each described embodiment, there is an alternate embodiment for which the eyewear 102 operates autonomously, independent of any connected mobile device.

When a user runs one or more applications on the mobile device 112, the coupled eyewear 102 detects and determines the directions of specific wireless devices. On a short lunch break, for example, the user would like to quickly locate an eating establishment in his immediate vicinity, and he launches the appropriate application on his mobile device 112. The application allows the mobile device 112 to operate together with the eyewear 102, which, in turn, uses its multiple beamforming antennas 206 to simultaneously scan for radio traffic and beacons. When radio energy is detected, the eyewear 102 can wait to detect a beacon frame or isolate a frequency and transmit a probe request, either directly or using the mobile device 112. From a probe response or an initially detected beacon frame, the eyewear 102 determines if the detected wireless device identifies an eating establishment, and further, what type of food the establishment serves. The eyewear 102 can also receive transmitted e-coupons. If additional information is sought from a wireless device after it is identified, the eyewear 102 interrogates the device by sending data requests.

The eyewear 102 uses its beamforming antennas 206 to determine directions to wireless devices associated with identified eating establishments and sends the mobile device 112 a list that specifies the eating establishments, along with direction information, lunch specials, and any other information the eyewear 102 might have gathered. For the embodiment shown at 700, the list includes a coffee shop 706 identified behind the user. The eyewear 102 can alternatively determine a relative direction to a particular eating establishment after the user has selected it from the list using his mobile device 112. The eyewear 102 sends the determined direction to the mobile device 112, where it is displayed on the display 114 of the mobile device 112 as shown in FIG. 1. In an alternate embodiment, the eyewear 102 includes a display, such as a heads-up display, coupled to the processing element 212 and configured to display the direction information for the detected wireless device for the selected eating establishment. In another embodiment, the eyewear 102 includes audio speakers associated with the ears of the user and can offer a soft ping on the side of the direction of interest. This would help guide the user to change the facing direction. Note that various audio clues (e.g., pitch, volume) could be used to suggest scale of turn or closeness of target.

In another embodiment, the user of the mobile device 112 is in a crowded airport and is unable to see an electronic kiosk 704 he would like to use for checking in. The beamforming antennas 206 of the eyewear 102 are able to detect, identify, and determine a direction to the electronic kiosk 704. The eyewear 102 provides the mobile device 112 with direction information that allows the mobile device 112 to guide the user to the electronic kiosk 704 by displaying the direction to the electronic kiosk 704 relative to the direction the user is looking and/or walking. In a further embodiment, the user purchases his e-ticket online at the airport using his mobile device 112 and would like to locate a public printer (not shown) to obtain a hardcopy. Again, under the control of the mobile device 112 running the appropriate application, the eyewear 102 uses its beamforming antennas to locate and direct the user to the public printer, or any other electronic resource, he is seeking. As the user negotiates obstacles in approaching the printer, the eyewear 102 continues to scan the printer and updates the mobile device 112 with the current direction to the printer relative to the position of the eyewear 102.

For one embodiment, the eyewear 102 identifying the first wireless device comprises identifying a peer device. By running a "friend finder" application on the mobile device 112, a user is able to utilize the coupled eyewear 102 to locate his friends. When in a city where friends of the user work, reside, or are scheduled to be, the mobile device 112 uses the eyewear 102 to scan for peer devices belonging to the friends. If the eyewear 102 cannot locate the friends by passively scanning, the eyewear 102 can also actively scan by sending out transmissions configured to elicit responses from any of the peer devices within range.

Upon locating a first peer device 708, the eyewear 102 determines the direction of the first peer device 708 relative to the eyewear 102. For a particular embodiment, the eyewear 102 determines a direction in which the user must turn his head to be facing the first peer device 708, taking into account the direction the user is already facing. While the user is moving in the direction of travel 720, the first peer device 708 is also moving with a direction and speed indicated at 712. As both the eyewear 102 and the first peer device 708 move, the eyewear continuously or intermittently scans radio transmissions from the first peer device 708 to determine a direction to the first peer device 708.

The eyewear 102 also uses at least one of its beamforming antennas 206 to detect and identify a second peer device 710 moving with a direction and speed indicated at 714. The eyewear 102 tracks the direction of both the first 708 and second 710 peer devices independently, using different beamforming antennas, as the relative position of the eyewear 102 changes with respect to the first 708 and second 710 peer devices. The user is able to use this direction information to adjust his heading to stay within range of his friends or to meet up with them.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for determining direction information for one or more wireless devices relative to eyewear by using a plurality of beamforming antennas, the method comprising:
   scanning, using a detection beam, at least a first radio frequency of multiple radio frequencies using at least a first beamforming antenna and a second beamforming antenna of the plurality of beamforming antennas that are mechanically integrated with, and communicatively coupled to, the eyewear;
   detecting, on the first scanned radio frequency, first externally emitted radio energy using the first and second beamforming antennas;
   identifying a first wireless device using the detected first externally emitted radio energy; and
   determining a first direction and estimated distance of the first wireless device relative to the eyewear based on a signal strength of the detected first externally emitted radio energy detected using the first and second beamforming antennas.

2. The method of claim 1 further comprising establishing a connection to the first wireless device.

3. The method of claim 2, wherein the first wireless device is a first wireless access point and establishing a connection to the first wireless device includes aiming the first beamforming antenna of the plurality of beamforming antennas in the first direction, the method further comprising:
   scanning, using a detection beam, at least a second radio frequency and a third radio frequency of the multiple radio frequencies using the second beamforming antenna of the plurality of beamforming antennas;
   detecting, on the second radio frequency and the third radio frequency, second and third externally emitted radio energy using the second beamforming antenna;
   identifying a second wireless access point using the detected second externally emitted radio energy, and identifying a third wireless access point using the detected third externally emitted radio energy;
   determining a second direction of the second wireless access point relative to the eyewear and a third direction of the third wireless access point relative to the eyewear based on the detected second and third externally emitted radio energy detected using the second beamforming antenna;
   determining a direction of travel for the eyewear; and
   selecting, based on the second and third directions relative to the direction of travel, the second wireless access point instead of the third wireless access point for a handoff, by the eyewear, of the network connection from the first wireless access point to the second wireless access point.

4. The method of claim 1 further comprising displaying the first direction of the first wireless device on the eyewear.

5. The method of claim 1 further comprising providing the first direction of the first wireless device to a mobile device communicatively coupled to the eyewear for establishing a connection between the mobile device and the first wireless device.

6. The method of claim 5 further comprising maintaining direction information for the first wireless device, wherein the maintaining comprises:
   determining, at a first time, a second direction of the first wireless device relative to the eyewear by using at least the first beamforming antenna to electronically detect a change in the signal strength of the signal from the first wireless device, the second direction being a direction that restores the signal strength of the signal from the first wireless device;
   aiming the first beamforming antenna of the plurality of beamforming antennas in the second direction;
   determining, at a second time after the first time, a third direction of the first wireless device relative to the eyewear by using at least the first beamforming antenna to electronically detect another change in the signal strength of the signal from the first wireless device, the third direction being another direction that restores the signal strength of the signal from the first wireless device; and
   changing the aiming of the first beamforming antenna from the second direction to the third direction.

7. The method of claim 6, wherein the third direction is determined in response to at least one of:
   rotational motion of the eyewear; or
   translational motion of the eyewear relative to the first wireless device.

8. The method of claim 5, wherein the first wireless device is a first wireless access point, the method further comprising:
   aiming the first beamforming antenna of the plurality of beamforming antennas at the first wireless access point;
   scanning, using a detection beam, at least a second and third radio frequency of the multiple radio frequencies using the second beamforming antenna of the plurality of beamforming antennas;
   detecting, on the second and third radio frequency, second and third externally emitted radio energy using the second beamforming antenna;
   identifying a second wireless access point using the detected second externally emitted radio energy, and identifying a third wireless access point using the detected third externally emitted radio energy; and
   selecting the second wireless access point instead of the third wireless access point for a handoff, by the mobile device, of a network connection, between the mobile device and the first wireless access point, from the first wireless access point to the second wireless access point.

9. The method of claim 8 further comprising:
determining a second direction of the second wireless access point relative to the eyewear; and
determining a third direction of the third wireless access point relative to the eyewear, wherein the selecting is based on the second direction as compared to the third direction.

10. The method of claim 9, further comprising determining a direction of travel for the eyewear, wherein the second wireless access point is selected over the third wireless access point for the handoff based on the second direction being more closely aligned with the direction of travel than the third direction.

11. The method of claim 10, wherein determining the direction of travel for the eyewear comprises using a set of beamforming antennas of the plurality of beamforming antennas to determine a change in a first direction of the first wireless access point relative to the eyewear over an interval of time, and wherein scanning the at least one of the multiple radio frequencies is based on the eyewear traveling away from the first wireless device.

12. The method of claim 5 further comprising receiving an indication of a probe request sent by the mobile device on the first scanned radio frequency, wherein the detecting on the first scanned radio frequency is in response to the probe request.

13. The method of claim 1, wherein scanning multiple radio frequencies using at least two beamforming antennas comprises a second beamforming antenna of the plurality of beamforming antennas scanning a first channel of a first band contemporaneously with a third beamforming antenna of the plurality of beamforming antennas scanning a second channel of a second and different band.

14. The method of claim 13, wherein the first band is a 2.4 Gigahertz band for communicating using at least one Institute of Electrical and Electronics Engineers 802.11 standard and the second band is a 5 Gigahertz band for communicating using the at least one Institute of Electrical and Electronics Engineers 802.11 standard.

15. The method of claim 1, wherein identifying the first wireless device comprises identifying a peer device.

16. The method of claim 1 further comprising:
identifying a retail establishment using the detected first externally emitted radio energy; and
determining a direction of the retail establishment relative to the eyewear using a set of beamforming antennas of the plurality of beamforming antennas.

17. Eyewear configured for determining direction information for a wireless device relative to the eyewear by using a plurality of beamforming antennas, the eyewear comprising:
an eyewear frame;
an antenna arrangement comprising the plurality of beamforming antennas mechanically integrated with the eyewear frame and communicatively coupled to an antenna control module, which is configured to control the plurality of beamforming antennas;
a transceiver coupled to the antenna arrangement and configured to receive radio signals using the plurality of beamforming antennas; and
a processing element coupled to the antenna arrangement and the transceiver, the processing element configured to cooperatively operate with the antenna arrangement and the transceiver to:
scan, using a detection beam, at least a first radio frequency of multiple radio frequencies using at least a first beamforming antenna and a second beamforming antenna of the plurality of beamforming antennas;
detect, on the first scanned radio frequency, first externally emitted radio energy using the first and second beamforming antennas;
identify a first wireless device using the first externally emitted radio energy; and
determine direction information for a first direction and an estimated distance for the first wireless device based on a signal strength of the detected first externally emitted radio energy detected using the first and second beamforming antennas.

18. The eyewear of claim 17 further comprising a display coupled to the processing element and configured to display the direction information for the first wireless device.

19. The eyewear of claim 17 further comprising a transceiver coupled to the processing element and configured to establish a wireless connection to a mobile device to at least provide to the mobile device the direction information for the first wireless device.

20. The eyewear of claim 19, wherein the processing element is further configured to control the transceiver to:
send a first message to the mobile device indicating a scanned radio frequency containing initially detected radio energy in a frequency band also containing the first scanned radio frequency; and
receive a second message from the mobile device indicating the mobile device is transmitting a probe request on the first scanned radio frequency; and
wherein the processing element is further configured to control the antenna control module and at least one of the beamforming antennas of the plurality of beamforming antennas to receive, on the first scanned radio frequency, a probe response contained within the detected first externally emitted radio energy, wherein the first wireless device is identified using the probe response.

* * * * *